United States Patent
Onoue et al.

(10) Patent No.: US 8,431,258 B2
(45) Date of Patent: Apr. 30, 2013

(54) PERPENDICULAR MAGNETIC RECORDING MEDIUM AND METHOD OF MANUFACTURING THE SAME

(75) Inventors: Takahiro Onoue, Singapore (SG); Tokichiro Sato, Singapore (SG); Takenori Kajiwara, Singapore (SG)

(73) Assignee: WD Media (Singapore) Pte. Ltd., Singapore (SG)

( * ) Notice: Subject to any disclaimer, the term of this patent is extended or adjusted under 35 U.S.C. 154(b) by 385 days.

(21) Appl. No.: 12/749,854

(22) Filed: Mar. 30, 2010

(65) Prior Publication Data

US 2010/0247964 A1    Sep. 30, 2010

(30) Foreign Application Priority Data

Mar. 30, 2009 (JP) ................. 2009-083611
Mar. 30, 2009 (JP) ................. 2009-083612
Mar. 31, 2009 (JP) ................. 2009-087760
Mar. 31, 2009 (JP) ................. 2009-087761

(51) Int. Cl.
*G11B 5/66* (2006.01)

(52) U.S. Cl.
USPC ............................................ 428/831

(58) Field of Classification Search .......... None
See application file for complete search history.

(56) References Cited

U.S. PATENT DOCUMENTS

2007/0153419 A1* 7/2007 Arai et al. ............ 360/131
2008/0062575 A1   3/2008 Shimizu
2008/0213629 A1* 9/2008 Bian et al. .............. 428/831
2010/0035085 A1* 2/2010 Jung et al. .............. 428/800

FOREIGN PATENT DOCUMENTS

JP   2006-024346 A   1/2006
JP   2007-184019 A   7/2007

OTHER PUBLICATIONS

T. Oikawa, et al., "Microstructure and Magnetic Properties of CoPtCr-SiO$_2$ Perpendicular Recording Media", IEEE Transactons on Magnetics, Sep. 2002, pp. 1976-1978, vol. 38, No. 5.

* cited by examiner

*Primary Examiner* — Holly Rickman

(57) ABSTRACT

A perpendicular magnetic recording medium comprises a magnetic recording layer that records a signal, an underlayer formed of Ru or Ru compound below the magnetic recording layer, a non-magnetic layer formed of a non-magnetic material below the underlayer to control crystal orientation of the underlayer, a soft magnetic layer provided below the non-magnetic layer, and a substrate on which the magnetic recording layer, the underlayer, the non-magnetic layer, and the soft magnetic layer are formed. The non-magnetic layer comprises a first non-magnetic layer formed above the soft magnetic layer and a second non-magnetic layer formed above the first non-magnetic layer. The first non-magnetic layer is formed of amorphous Ni compound while the second non-magnetic layer is formed of crystalline Ni or crystalline Ni compound.

5 Claims, 8 Drawing Sheets

| | | 1ST PRECEDING UNDERLAYER | 2ND PRECEDING UNDERLAYER | 1ST UNDERLAYER | Ra [nm] | Δθ50 [deg] | Hc [Oe] | Hn [Oe] | SNR [dB] |
|---|---|---|---|---|---|---|---|---|---|
| Example | 1 | 45Ni55Ta | 97Ni3W | Ru | 0.18 | 2.3 | 4950 | -2520 | 18.5 |
| | 2 | 50Ni50Ti | 97Ni3W | Ru | 0.18 | 2.4 | 4920 | -2550 | 18.4 |
| | 3 | 45Ni55Ta | 97Ni3W | 90Ru10Cr | 0.18 | 2.3 | 4920 | -2490 | 18.4 |
| Comparative Example | 1 | 45Ni55Ta | – | Ru | 0.17 | 5.2 | 3880 | -1800 | 15.8 |
| | 2 | – | 97Ni3W | Ru | 0.21 | 3.1 | 5120 | -2630 | 17.5 |

| | | 1ST PRECEDING UNDERLAYER | 2ND PRECEDING UNDERLAYER | 1ST UNDER-LAYER | Ra [nm] | Δθ50 [deg] | Hc [Oe] | Hn [Oe] | SNR [dB] |
|---|---|---|---|---|---|---|---|---|---|
| Example | 1 | 45Ni55Ta | 97Ni3W | Ru | 0.18 | 2.3 | 4950 | -2520 | 18.5 |
| | 2 | 50Ni50Ti | 97Ni3W | Ru | 0.18 | 2.4 | 4920 | -2550 | 18.4 |
| | 3 | 45Ni55Ta | 97Ni3W | 90Ru10Cr | 0.18 | 2.3 | 4920 | -2490 | 18.4 |
| Comparative Example | 1 | 45Ni55Ta | – | Ru | 0.17 | 5.2 | 3880 | -1800 | 15.8 |
| | 2 | – | 97Ni3W | Ru | 0.21 | 3.1 | 5120 | -2630 | 17.5 |

FIG. 2

| | | 1ST PRECEDING UNDERLAYER | 2ND PRECEDING UNDERLAYER | 1ST UNDER-LAYER | Ra [nm] | Δθ50 [deg] | Hc [Oe] | Hn [Oe] | SNR [dB] |
|---|---|---|---|---|---|---|---|---|---|
| Example | 4 | 65Ni35Ta | 97Ni3W | Ru | 0.22 | 2.7 | 4820 | -2410 | 17.9 |
| | 5 | 55Ni45Ta | 97Ni3W | Ru | 0.19 | 2.4 | 4930 | -2510 | 18.4 |
| | 1 | 45Ni55Ta | 97Ni3W | Ru | 0.18 | 2.3 | 4950 | -2520 | 18.5 |
| | 6 | 35Ni65Ta | 97Ni3W | Ru | 0.18 | 2.3 | 4810 | -2310 | 17.8 |

| | | 1ST PRECEDING UNDERLAYER | 2ND PRECEDING UNDERLAYER | 1ST UNDER-LAYER | Ra [nm] | Δθ50 [deg] | Hc [Oe] | Hn [Oe] | SNR [dB] |
|---|---|---|---|---|---|---|---|---|---|
| Example | 1 | 45Ni55Ta | 97Ni3W | Ru | 0.18 | 2.3 | 4950 | -2520 | 18.5 |
| | 7 | 45Ni55Ta | 95Ni5W | Ru | 0.18 | 2.2 | 4920 | -2500 | 18.5 |
| | 8 | 45Ni55Ta | 93Ni7W | Ru | 0.17 | 2.2 | 4880 | -2480 | 18.2 |
| | 9 | 45Ni55Ta | 91Ni9W | Ru | 0.18 | 2.3 | 4750 | -2380 | 17.7 |

| | | MATERIAL | | | Dq50(Ru) [deg] | GRAIN DIAMETER [nm] | SNR [dB] |
|---|---|---|---|---|---|---|---|
| | | 1ST PRECEDING UNDERLAYER | 2ND PRECEDING UNDERLAYER | LOWER RECORDING LAYER | | | |
| Example | 21 | 50Cr50Ta | 95Ni5W | 95(Co-10Cr-18Pt)-2.5($SiO_2$)-2.5($TiO_2$) | 2.4 | 8.6 | 18.6 |
| | 22 | 50Ni50Ta | | 95(Co-10Cr-18Pt)-2.5($SiO_2$)-2.5($TiO_2$) | 2.4 | 8.7 | 18.5 |
| Comparative Example | 21 | - | | 95(Co-10Cr-18Pt)-2.5($SiO_2$)-2.5($TiO_2$) | 3 | 8.5 | 17.8 |
| | 22 | - | | 95(72Co-10Cr-18Pt)-5($SiO_2$) | 3.1 | 8.2 | 18 |
| | 23 | 50Cr50Ta | | 95(72Co-10Cr-18Pt)-5($SiO_2$) | 2.3 | 9.2 | 18.2 |
| | 24 | 50Ni50Ta | | 95(72Co-10Cr-18Pt)-5($SiO_2$) | 2.4 | 9.1 | 18.2 |

FIG. 5

| | Composition of Amorphous Protective Layer | Film Thickness [nm] | Composition of Preceding Underlayer | Film Thickness [nm] | SNR [dB] |
|---|---|---|---|---|---|
| Example 41 | 45Ni55Ta (950HV) | 0 | 95Ni5W | 7.2 | 18.0 |
| | | 0.7 | | | 18.1 |
| | | 1.4 | | | 18.3 |
| | | 2.4 | | | 18.4 |
| Comparative Example 41 | 97Ni3W (160HV) | 0 | | 4.3 | 17.6 |
| | | 1.4 | | | 17.4 |
| | | 2.9 | | | 17.3 |
| Comparative Example 42 | 90Ni10Ta (250HV) | 0 | | 5.8 | 17.5 |
| | | 0.7 | | | 17.3 |
| | | 1.4 | | | 17.3 |
| | | 2.4 | | | 17.4 |

PERPENDICULAR MAGNETIC RECORDING MEDIUM AND METHOD OF MANUFACTURING THE SAME

This application is based upon and claims the benefit of priority from Japanese Patent Application No. 2009-083611, filed on Mar. 30, 2009, Japanese Patent Application No. 2009-083612, filed on Mar. 30, 2009, Japanese Patent Application No. 2009-087760, filed on Mar. 31, 2009, and Japanese Patent Application No. 2009-087761, filed on Mar. 31, 2009, the disclosures of which are incorporated herein in their entirety by reference.

BACKGROUND

1. Field of the Invention

The present invention relates to a perpendicular magnetic recording medium mounted on a perpendicular magnetic recording type hard disk drive (HDD) or the like and a method of manufacturing such a medium.

2. Description of the Related Art

Various information recording techniques have been developed along with recent increase of capacity in information processing. Particularly, the areal recording density of hard disk drives (HDDs) using a magnetic recording technique has continued to increase at an annual rate of about 100%. Recently, a 2.5-inch magnetic disk used for an HOD or the like has been required to have an information storage capacity greater than 200 Gbytes per disk. In order to meet such a demand, it is necessary to achieve an information recording density greater than 400 Gbits/inch$^2$.

In order to achieve a high recording density of a magnetic recording medium used for an HDD or the like, a perpendicular magnetic recording type magnetic disk has been proposed in recent years. A perpendicular magnetic recording type medium has a magnetic recording layer with a magnetization easy axis oriented perpendicular to a surface of a substrate. As compared to a conventional in-plane magnetic recording type, the perpendicular magnetic recording type can reduce a thermal fluctuation phenomenon, in which the thermal stability of recorded signals is deteriorated due to the superparamagnetism phenomenon so that the recorded signals are lost. Accordingly, the perpendicular magnetic recording type is suitable to increase the recording density.

Use of a CoCrPt—SiO$_2$ perpendicular magnetic recording medium has been proposed for a magnetic recording medium of a perpendicular magnetic recording type because a CoCrPt—SiO$_2$ perpendicular magnetic recording medium exhibits high thermal stability and excellent recording characteristics (see T. Oikawa et. al., IEEE Trans. Magn, vol. 38, 1976-1978 (2002) (Non-Patent Document 1)). Size reduction of magnetic grains in a magnetic recording layer and improvement of the magnetic coercive force (Hc) are achieved by forming a granular structure in which non-magnetic grain boundaries are formed by segregating SiO$_2$ between magnetic grains in which crystals of a hexagonal close-packed (hcp) structure of Co have grown continuously into a columnar shape. It has been known that oxide is used for non-magnetic grain boundaries (non-magnetic portions between magnetic grains). For example, use of one of SiO$_2$, Cr$_2$O$_3$, TiO, TiO$_2$, and Ta$_2$O$_5$ has been proposed (JP-A-2006-024346 (Patent Document 1)).

Meanwhile, important factors to increase the recording density include improvement of magnetostatic characteristics, such as the magnetic coercive force (Hc) and the reversed domain nucleation magnetic field (Hn), and improvement of electromagnetic characteristics, such as the overwrite performance (OW performance), the signal-to-noise ratio (SNR), and the reduction of the track width. Among other things, improvement of the magnetic coercive force (He) and the SNR is important to read and write data accurately at a high speed even with recording bits having a small area.

Improvement of the SNR is achieved mainly by noise reduction of a magnetic transition region in a magnetic recording layer. Factors effective in noise reduction include improvement in crystal orientation of a magnetic recording layer, reduction of the grain diameter of magnetic grains, and isolation of magnetic grains. Particularly, in order to improve the crystal orientation of a magnetic recording layer, an underlayer is provided in a perpendicular magnetic recording medium. Crystal grains of a magnetic recording layer grow on crystal grains of the underlayer. Therefore, the crystal orientation of the magnetic recording layer can be improved. Because the crystal orientation of the underlayer affects the crystal orientation of the magnetic recording layer, a crystal seed layer (non-magnetic layer) is provided underneath the underlayer so as to improve the crystal orientation of the underlayer.

The seed layer (non-magnetic layer) has heretofore been formed by a single layer. Recently, a perpendicular magnetic recording medium having a seed layer of a double-layer structure has been developed (JP-A-2007-184019 (Patent Document 2)). According to Patent Document 2, a seed layer is formed of an amorphous alloy containing Cr and a crystal alloy containing Ni as a principal component. With this seed layer, a perpendicular magnetic recording medium can maintain a good SNR and can have excellent corrosion resistance.

SUMMARY

While a magnetic recording medium has been increased in recording density as described above, further improvement of the recording density has been demanded. In order to obtain further increase of the recording density of a magnetic recording medium, a new method capable of further improving the SNR should be established.

The inventors have examined solutions for further improving the SNR and have found that they have to focus on states of boundary surfaces of a non-magnetic layer and a plurality of layers formed on the non-magnetic layer. Specifically, the inventors have considered that the crystallinity of the magnetic recording layer becomes disordered when the boundary surfaces are roughened and that the SNR can be improved by reduction of the roughness of those boundary surfaces.

According to careful examination of boundary surfaces of a magnetic recording medium, the inventors have found that the roughness of the boundary surfaces start to increase from a boundary surface between a non-magnetic layer and a soft magnetic layer formed right below the non-magnetic layer. Therefore, the inventors have considered that, since this boundary surface is rough (the boundary surface has a high roughness), layers to be formed above the boundary surface grow with maintaining the state of this boundary surface (i.e., the rough state) so as to roughen boundary surfaces of the multiple layers formed above the non-magnetic layer.

It is conceivable that the roughness of the boundary surfaces is reduced by forming a non-magnetic layer into multiple layers. Nevertheless, the main function of the non-magnetic layer is to improve the crystal orientation of an underlayer formed of Ru. Although the perpendicular magnetic recording medium disclosed in Patent Document 2 also has a plurality of non-magnetic layers (seed layers), the non-magnetic layers are formed of different materials for the purpose of corrosion resistance. Therefore, those non-magnetic layers have different atomic distances of crystals, so that continuous growth of crystal grains is inhibited. Accordingly, it is difficult to achieve further improvement of the crystal orientation of an underlayer and dramatic improvement of the SNR with this technology. In other words, mere dividing a non-magnetic layer into multiple layers is not sufficient, and a non-magnetic layer should be formed under specific conditions for definite purposes.

The present invention has been made in view of the above drawbacks. It is, therefore, an object of the present invention is to provide a perpendicular magnetic recording medium capable of improving the crystal orientation by reduction of the roughness of a boundary surface between a non-magnetic layer and a soft magnetic layer, of improving the SNR by improvement of atomic distance matching between the non-magnetic layer and an underlayer, and of further increasing the recording density. It is another object of the present invention is to provide a method of manufacturing such a perpendicular magnetic recording medium.

The inventors have diligently studied the solution of the above problems and have attracted attention to a material of a non-magnetic layer. The inventors' continuous research has revealed that a boundary surface between a non-magnetic layer and a soft magnetic layer tends to be roughened when a crystalline material, particularly a crystalline Ni compound, is used for the non-magnetic layer. The inventors considered use of materials other than crystalline Ni compound for a non-magnetic layer. However, crystalline Ni compound is used to prevent corrosion deposition from a soft magnetic layer and to maintain the magnetic characteristics. Thus, crystalline Ni compound needs to be used in order to maintain those characteristics.

The inventors have continuously studied and have found that, when a layer is interposed between a non-magnetic layer and a soft magnetic layer below the non-magnetic layer under certain conditions, it is possible to eliminate adverse influence on the soft magnetic layer from the non-magnetic layer and to solve the above drawbacks while crystalline Ni compound is used for the non-magnetic layer. Thus, the inventors have completed the present invention.

That is, in order to solve the above drawbacks, a first typical configuration of a perpendicular magnetic recording medium according to the present invention comprises a magnetic recording layer that records a signal, an underlayer formed of Ru or Ru compound below the magnetic recording layer, a non-magnetic layer formed of a non-magnetic material below the underlayer to control crystal orientation of the underlayer, a soft magnetic layer provided below the non-magnetic layer, and a substrate on which the magnetic recording layer, the underlayer, the non-magnetic layer, and the soft magnetic layer are formed. The non-magnetic layer comprises a first non-magnetic layer formed above the soft magnetic layer and a second non-magnetic layer formed above the first non-magnetic layer. The first non-magnetic layer is formed of amorphous Ni compound while the second non-magnetic layer is formed of crystalline Ni or crystalline Ni compound.

With the above configuration, the first non-magnetic layer of amorphous Ni compound is interposed between the second non-magnetic layer, i.e., a conventional crystalline non-magnetic layer, and the soft magnetic layer. Thus, the soft magnetic layer can be protected by the first non-magnetic layer, and adverse influence on the soft magnetic layer from the crystalline non-magnetic layer (second non-magnetic layer) can be eliminated. Therefore, the surface roughness of the soft magnetic layer can be reduced. Accordingly, the roughness of the boundary surfaces of the soft magnetic layer and the layers formed on the soft magnetic layer can be improved. Thus, the crystal orientation of those layers can be improved. As a result, the SNR can be improved, and further increase of the recording density can be achieved.

Furthermore, the first non-magnetic layer is formed of Ni compound, and the second non-magnetic layer is formed of Ni or Ni compound. Thus, both of the first non-magnetic layer and the second non-magnetic layer contain Ni. Therefore, the atomic distance of the first nonmagnetic layer can be made similar to the atomic distance of the second non-magnetic layer. Accordingly, the crystallinity of the second non-magnetic layer can be improved, and the crystallinity and the crystal orientation of the underlayer are also improved. Consequently, the SNR can further be improved.

It is desirable that the aforementioned first non-magnetic layer contains one or more elements selected from the group consisting of Ta, Ti, Hf, Re, Os, Ir, Mo, Nb, Zr, and V or a compound thereof in a range of from 40 atomic % to 60 atomic %. With this configuration, the Ni compound of the first non-magnetic layer can suitably be formed into an amorphous phase.

Furthermore, when the first non-magnetic layer contains the aforementioned element(s) or compound thereof in a range of from 40 atomic % to 60 atomic %, the Ni compound of the first non-magnetic layer can reliably be formed into an amorphous phase. If the ratio of the aforementioned element(s) or compound thereof is less than 40 atomic %, it is undesirable because the Ni compound cannot sufficiently be formed into an amorphous phase. If the ratio is higher than 60 atomic %, it is undesirable because the amount of Ni, which is a base of growth of crystal grains of the second non-magnetic layer formed on the first non-magnetic layer, unfavorably becomes insufficient.

It is desirable that the aforementioned second non-magnetic layer contains one or more elements selected from the group consisting of W, Cr, Mo, Re, Al, Cu, and Mn or a compound thereof in a range of from 3 atomic % to 8 atomic %. With this configuration, the Ni compound of the second non-magnetic layer can suitably be crystallized. Particularly, the atomic distance of W is greater than the atomic distance of Ni and is closer to the atomic distance of Ru. Therefore, when the second non-magnetic layer contains W, the atomic distance of the Ni compound of the second non-magnetic layer can be made similar to the atomic distance of the underlayer of Ru. Accordingly, it is possible to promote continuous growth of crystal grains from the second non-magnetic layer to the underlayer.

Furthermore, when the second non-magnetic layer contains the aforementioned element(s) or compound thereof in a range of 3 atomic % to 8 atomic %, the Ni compound of the second non-magnetic layer can reliably be crystallized, and the corrosion resistance characteristics and magnetic characteristics can be maintained. If the ratio is less than 3 atomic %, it is undesirable because the Ni compound unfavorably shows a ferromagnetic property. If the ratio is higher than 8 atomic %, it is undesirable because the orientation of Ni is unfavorably deteriorated.

A second typical configuration of the perpendicular magnetic recording medium according to the present invention comprises a magnetic recording layer that records a signal, an underlayer formed of Ru or Ru compound below the magnetic recording layer, a non-magnetic layer to control crystal orientation of the underlayer, a soft magnetic layer provided below the non-magnetic layer, and a substrate on which the magnetic recording layer, the underlayer, the non-magnetic layer, and the soft magnetic layer are formed. The non-magnetic layer comprises a first non-magnetic layer formed of an amorphous material above the soft magnetic layer and a second non-magnetic layer formed of a crystalline material with an fcc structure above the first non-magnetic layer. The magnetic recording layer is formed of a Co-based alloy that grows into a columnar shape to form magnetic crystal grains and a plurality of oxides that forms non-magnetic grain boundaries between the crystal grains.

With the above second configuration, the first non-magnetic layer of an amorphous material is interposed between the second non-magnetic layer of a crystalline material, i.e., a conventional non-magnetic layer, and the soft magnetic layer. An amorphous material has hardness higher than a crystalline material. Therefore, the soft magnetic layer can suitably be protected from impact of formation of the second non-magnetic layer (conventional non-magnetic layer) by using the first non-magnetic layer, which is a hard film. Accordingly, it is possible to eliminate adverse influence on the soft magnetic layer from the second non-magnetic layer. Therefore, the surface roughness of the soft magnetic layer can be reduced. Thus, the roughness of a boundary surface between the non-magnetic layer and the soft magnetic layer is reduced. Consequently, the roughness of boundary surfaces of the soft magnetic layer and the layers formed on the soft magnetic layer can be reduced. Thus, the crystal orientation of those layers can be improved. As a result, the SNR can be improved. Furthermore, corrosion deposition from the soft magnetic layer can be prevented by the second non-magnetic layer of a crystalline material, and good magnetic characteristics can be maintained. Moreover, when the second non-magnetic layer is formed of a crystalline material having an fcc structure, crystal grains of the underlayer having an hcp structure grow on the (111) surface of the fcc structure of the second non-magnetic layer, so that the magnetization easy axis of the underlayer can be oriented to the perpendicular direction. Therefore, noise can be reduced, and the SNR can further be improved.

Furthermore, when the grain boundaries of the magnetic recording layer are formed by a plurality of oxides, characteristics of a plurality of oxides can be obtained. Therefore, size reduction and isolation of the crystal grains (magnetic grains) of the magnetic recording layer can further be promoted as compared to a case where grain boundaries are formed by one kind of oxide. Accordingly, size increase of the crystal grains of the magnetic recording layer, which would be caused by improvement of the crystal orientation due to the interposition of the first non-magnetic layer, is prevented. Consequently, the SNR is not lowered even if the crystal orientation is remarkably improved. As a result, the SNR can drastically be improved, and further increase of the recording density of the perpendicular magnetic recording medium can be achieved.

In the second typical configuration, it is desirable that the aforementioned first non-magnetic layer contains one or more elements selected from the group consisting of Ni, Fe, Co, Cu, Zn, Pd, and Pt or a compound thereof and one or more elements selected from the group consisting of Ta, Ti, Hf, Re, Os, Ir, Mo, Nb, Zr, and V or a compound thereof.

Thus, when the first non-magnetic layer contains one or more elements selected from the group consisting of Ni, Fe, Co, Cu, Zn, Pd, and Pt or a compound thereof, the first non-magnetic layer can protect the soft magnetic layer more effectively, so that the surface roughness of the soft magnetic layer can further be reduced. Moreover, when the first non-magnetic layer contains one or more elements selected from the group consisting of Ta, Ti, Hf, Re, Os, Ir, Mo, Nb, Zr, and V or a compound thereof, the first non-magnetic layer can suitably be formed into an amorphous phase.

In the second typical configuration, it is desirable that the aforementioned second non-magnetic layer contains one or more elements selected from the group consisting of Ni, Co, Cu, Cr, Y, and Ag or a compound thereof and one or more elements selected from the group consisting of W, Cr, Mo, Re, Al, Cu, and Mn or a compound thereof.

Thus, when the second non-magnetic layer contains one or more elements selected from the group consisting of Ni, Co, Cu, Cr, Y, and Ag or a compound thereof, the corrosion resistance characteristics and magnetic characteristics of the second non-magnetic layer can further be improved. Moreover, when the second non-magnetic layer contains one or more elements selected from the group consisting of W, Cr, Mo, Re, Al, Cu, and Mn or a compound thereof, the second non-magnetic layer can suitably be non-magnetized and crystallized. Particularly, the atomic distance of W is larger than that of Ni and is closer to that of Ru. Therefore, when the second non-magnetic layer contains W, the atomic distance of the second non-magnetic layer can be made similar to the atomic distance of the underlayer of Ru in the case where Ni is used for the second non-magnetic layer. Accordingly, it is possible to promote continuous growth of crystal grains from the second non-magnetic layer to the underlayer.

In the second typical configuration, it is desirable that the oxides comprise an oxide of an element selected from the group consisting of Si, Ti, Cr, Co, Ta, Ru, and Cu. With this configuration, size reduction and isolation of crystal grains of the magnetic recording layer can further be promoted. Particularly, $SiO_2$, which is an oxide of Si, can promote size reduction and isolation of the magnetic grains most effectively. Furthermore, $TiO_2$, which is an oxide of Ti, has a property of improving the electromagnetic characteristics (particularly the SNR).

A first typical configuration of a method of manufacturing a perpendicular magnetic recording medium according to the present invention comprises:

forming a soft magnetic layer on a substrate;

forming a first non-magnetic layer of amorphous Ni compound on the soft magnetic layer without a bias voltage applied to the substrate;

forming a second non-magnetic layer of crystalline Ni compound on the first non-magnetic layer with a bias voltage applied to the substrate;

forming an underlayer of Ru or Ru compound on the second non-magnetic layer; and forming a magnetic recording layer above the underlayer, that records a signal.

With the first typical configuration of the method, the first non-magnetic layer is interposed between the soft magnetic layer and the second non-magnetic layer, i.e., a conventional non-magnetic layer that is formed with a bias voltage applied to a substrate. Since the first non-magnetic layer is formed without a bias voltage applied to the substrate, the soft magnetic layer is not damaged at the time of formation of the first nonmagnetic layer, and the surface roughness of the soft magnetic layer can be prevented from increasing. Accordingly, the roughness of the boundary surface between the soft magnetic layer and the first non-magnetic layer does not increase. When the second non-magnetic layer, which corresponds to a conventional non-magnetic layer, is formed on the first non-magnetic layer formed on the soft magnetic layer, the soft magnetic layer is protected by the first non-magnetic layer. Therefore, the surface roughness of the soft magnetic layer does not increase even if a bias voltage is applied to the substrate during the formation of the second non-magnetic layer. Furthermore, since the second non-magnetic layer can be formed with a bias voltage applied to the substrate, it is possible to prevent corrosion deposition from the soft magnetic layer and to maintain excellent magnetic characteristics. Therefore, while the non-magnetic layer (second non-magnetic layer) is formed with application of a bias voltage, it is possible to eliminate adverse influence on the soft magnetic layer from the second non-magnetic layer. Thus, the crystal orientation can be improved. As a result, the SNR can be improved, and further increase of the recording density can be achieved.

Furthermore, in the first typical configuration of the method, the first non-magnetic layer is formed of amorphous Ni compound. An amorphous material has hardness higher than a crystalline material. Therefore, the soft magnetic layer can suitably be protected from impact of formation of the conventional non-magnetic layer (second non-magnetic layer) by the hard film formed of an amorphous material. Since the first non-magnetic layer has high hardness, the roughness of the boundary surface between the first non-magnetic layer and the second non-magnetic layer does not increase even if a bias voltage is applied to the substrate during the formation of the second non-magnetic layer. Therefore, the roughness of the boundary surface between the crystalline non-magnetic layer and the layer right below the non-magnetic layer is reduced. Accordingly, the crystal orientation of the non-magnetic layer (initial growth layer) is improved, and the crystal orientation of the underlayer and the magnetic recording layer is improved. Furthermore, since grains of an amorphous material have no crystal structure, a layer of an amorphous material is deposited randomly on the soft magnetic layer. Therefore, fine irregularities of the surface of the soft magnetic layer that have been produced by microcrystals can be smoothened by the amorphous first non-magnetic layer. Thus, the surface roughness of the soft magnetic layer and the interface roughness of the layer formed on the soft magnetic layer can be reduced.

Furthermore, when both of the first non-magnetic layer and the second non-magnetic layer contain Ni as with the above configuration, the atomic distance of crystals of the first non-magnetic layer can be made similar to the atomic distance of crystals of the second non-magnetic layer. Accordingly, the crystallinity of the second non-magnetic layer is improved, and hence the crystallinity and the crystal orientation of the underlayer are also improved. Consequently, the SNR can further be improved.

In the first typical configuration of the method, it is desirable that the aforementioned first nonmagnetic layer contains Ni and a compound of one or more elements selected from the group consisting of Ta, Ti, Hf, Re, Os, Ir, Mo, Nb, Zr, and V. With this configuration, the first non-magnetic layer can suitably be formed into an amorphous phase.

In the first typical configuration of the method, it is desirable that the aforementioned second non-magnetic layer contains Ni and a compound of one or more elements selected from the group consisting of W, Cr, Mo, Re, Al, Cu, and Mn. With this configuration, the second non-magnetic layer can suitably be non-magnetized and crystallized. Particularly, the atomic distance of W is larger than that of Ni and is closer to that of Ru. Therefore, when the second nonmagnetic layer contains W, the atomic distance of the Ni compound can be made similar to the atomic distance of the underlayer of Ru in the case where Ni is used for the second non-magnetic layer. Accordingly, it is possible to promote continuous growth of crystal grains from the second non-magnetic layer to the underlayer.

In a second typical configuration of the method of manufacturing the perpendicular magnetic recording medium according to the present invention, the perpendicular magnetic recording medium comprises a magnetic recording layer that records a signal, an underlayer formed of Ru or Ru compound below the magnetic recording layer, a second non-magnetic layer formed of a non-magnetic crystalline material below the underlayer to control crystal orientation of the underlayer, a first non-magnetic layer formed of a crystalline material below the second non-magnetic layer, a soft magnetic layer provided below the first non-magnetic layer, and a substrate on which the magnetic recording layer, the underlayer, the first and second non-magnetic layers, and the soft magnetic layer are formed.

The second typical configuration of the method comprising:

forming the soft magnetic layer by using a target of a material having a Vickers hardness of A (HV);

forming the first nonmagnetic layer on the soft magnetic layer by using a target of a material having a Vickers hardness of B (HV); and forming the second non-magnetic layer on the first non-magnetic layer with a bias voltage applied to the substrate;

the Vickers hardness of A and the Vickers hardness of B being defined by an inequality of A<B.

With the second typical configuration of the method, the first non-magnetic layer formed on the soft magnetic layer has a Vickers hardness higher than the soft magnetic layer. Therefore, the soft magnetic layer is protected by the first non-magnetic layer. Thus, the surface roughness of the soft magnetic layer does not increase even if the second non-magnetic layer is formed with application of a bias voltage as in the prior art. Accordingly, the roughness of the boundary surface between the second non-magnetic layer and the soft magnetic layer is reduced. Thus, the crystal orientation can be improved. As a result, the SNR can be improved, and further increase of the recording density can be achieved.

In the second typical configuration of the method, it is desirable that the second non-magnetic layer is formed of NiW. With this configuration, it is possible to prevent corrosion deposition from the soft magnetic layer and to maintain the magnetic characteristics. Furthermore, if the first non-magnetic layer also contains Ni, both of the first non-magnetic layer and the second non-magnetic layer contain Ni. Therefore, the atomic distance of the crystals of the first non-magnetic layer can be made similar to the atomic distance of crystals of the second non-magnetic layer. Accordingly, the crystallinity of the second non-magnetic layer is improved, and the crystallinity and the crystal orientation of the underlayer are also improved. Consequently, the SNR can further be improved. Moreover, the atomic distance of W is larger than that of Ni and is closer to that of Ru. Therefore, when the second non-magnetic layer contains W, the atomic distance of the Ni compound can be made similar to the atomic distance of the underlayer of Ru. Accordingly, it is possible to promote continuous growth of crystal grains from the second non-magnetic layer to the underlayer.

In the second typical configuration of the method, it is desirable that the first non-magnetic layer is formed of NiTa or NiTi. With this configuration, the soft magnetic layer can suitably be protected from influence of the formation of the second non-magnetic layer by using the first non-magnetic layer.

In the second typical configuration of the method, it is desirable that a Ta content of the first non-magnetic layer is in a range of from 40 atomic % to 85 atomic %. With this configuration, the Vickers hardness of the first non-magnetic layer can be made higher than that of the soft magnetic layer. Therefore, it is possible to suitably protect the soft magnetic layer.

In the second typical configuration of the method, it is desirable that the Vickers hardness of B is not smaller than 800 HV. The Vickers hardness of a soft magnetic layer currently used is equal to or higher than about 700 HV and is lower than 750 HV. With the above configuration, since the Vickers hardness of the first non-magnetic layer exceeds that of the soft magnetic layer, the soft magnetic layer can suitably be protected by the first non-magnetic layer.

In the second typical configuration of the method, it is desirable that the first non-magnetic layer has a film thickness in a range of from 1 nm to 3 nm. If the thickness of the first non-magnetic layer is smaller than 1 nm, the soft magnetic layer may not be protected sufficiently. Furthermore, if the thickness of the first non-magnetic layer is greater than 3 nm, then the first non-magnetic layer may inhibit transmission of the magnetic flux to the soft magnetic layer when signals are written in the perpendicular magnetic recording medium. Therefore, the above range is preferable to the thickness of the first non-magnetic layer.

A third typical configuration of the perpendicular magnetic recording medium according to the present invention comprises a magnetic recording layer that records a signal, an underlayer formed of Ru or Ru compound below the magnetic recording layer, a second non-magnetic layer formed of a non-magnetic crystalline material below the underlayer to control crystal orientation of the underlayer, a soft magnetic layer provided below the second non-magnetic layer, and a substrate on which the magnetic recording layer, the underlayer, the second non-magnetic layers, and the soft magnetic layer are formed. The perpendicular magnetic recording medium further comprises a first non-magnetic layer formed of a crystalline material and provided between the second non-magnetic layer and the soft magnetic layer for protecting the soft magnetic layer from impact of sputtering deposition of the second non-magnetic layer.

According to the present invention, there is provided a perpendicular magnetic recording medium capable of improving the crystal orientation by reduction of the roughness of a boundary surface between a non-magnetic layer and a soft magnetic layer, of improving the SNR by improvement of atomic distance matching between the non-magnetic layer and an underlayer, and of further increasing the recording density. There is also provided a method of manufacturing such a perpendicular magnetic recording medium.

BRIEF DESCRIPTION OF THE DRAWINGS

FIG. 2 is a table showing variation of characteristics with respect to materials.

FIG. 5 is a table showing variation of characteristics with respect to materials of a first preceding underlayer and a lower recording layer.

DESCRIPTION OF THE PREFERRED EMBODIMENTS

Figure 1:
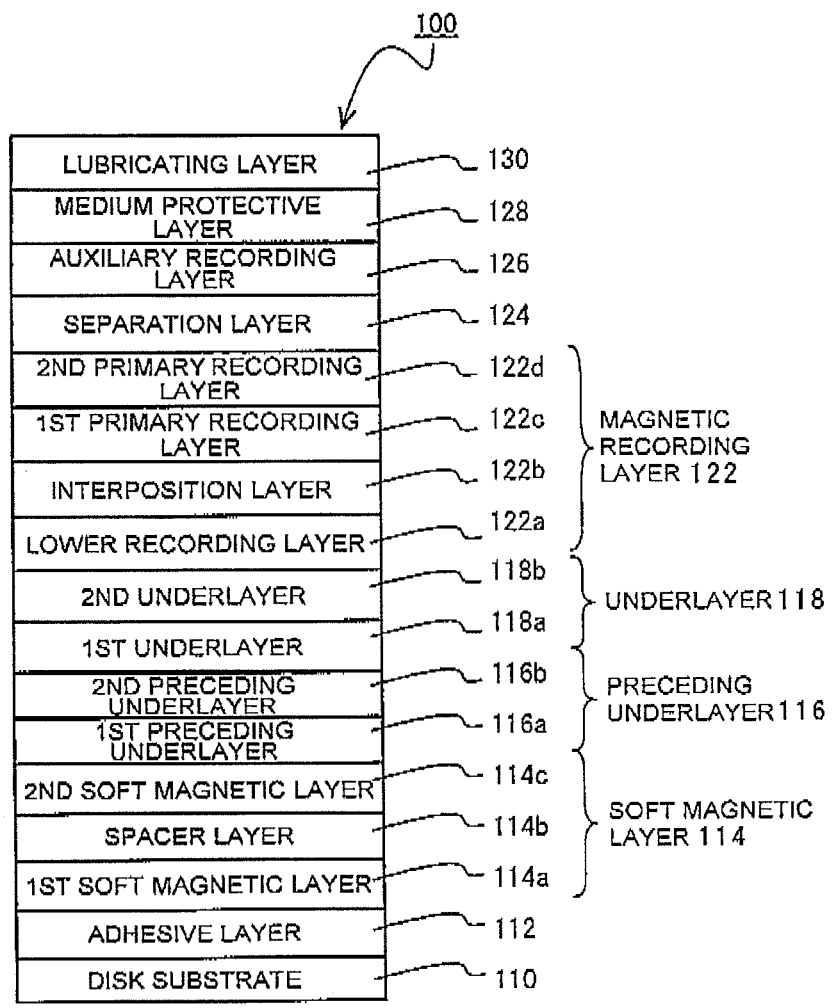
FIG. 1 is a diagram explanatory of a configuration of a perpendicular magnetic recording medium according to an embodiment.

Preferred embodiments of the present invention will be described in detail with reference to the accompanying drawings. The size, materials, and other specific values described in the following embodiments are mere examples for better understanding the present invention and do not limit the present invention unless otherwise explained. In the specification and drawings, elements having substantially the same function or structure are denoted by the same reference numerals, and the overlapping explanation thereof is omitted herein. Furthermore, elements that do not directly relate to the present invention are omitted from the illustration.

First Embodiment

Perpendicular Magnetic Recording Medium

FIG. 1 is a diagram explanatory of a configuration of a perpendicular magnetic recording medium 100 according to a first embodiment. The perpendicular magnetic recording medium 100 shown in FIG. 1 has a disk substrate 110, an adhesive layer 112, a first soft magnetic layer 114a, a spacer layer 114b, a second soft magnetic layer 114c, a first preceding underlayer 116a (first non-magnetic layer), a second preceding underlayer 116b (second non-magnetic layer), a first underlayer 118a, a second underlayer 118b, a lower recording layer 122a, an interposition layer 122b, a first primary recording layer 122c, a second primary recording layer 122d, a separation layer 124, an auxiliary recording layer 126, a medium protective layer 128, and a lubricating layer 130. The first soft magnetic layer 114a, the spacer layer 114b, and the second soft magnetic layer 114c jointly form a soft magnetic layer 114. The first preceding underlayer 116a and the second preceding underlayer 116b jointly form a preceding underlayer 116. The first underlayer 118a and the second underlayer 118b jointly form an underlayer 118. The lower recording layer 122a, the interposition layer 122b, the first primary recording layer 122c, and the second primary recording layer 122d jointly form a magnetic recording layer 122.

An amorphous aluminosilicate glass may be formed into a circular plate by direct pressing, and the resultant glass disk may be used as the disk substrate 110. The kind, size, thickness, and the like of the glass substrate are not specifically limited. Examples of materials for the glass substrate include aluminosilicate glass, soda lime glass, soda aluminosilicate glass, aluminoborosilicate glass, borosilicate glass, quartz glass, chain silicate glass, and glass ceramic such as crystallized glass. This glass disk is sequentially subjected to grinding, polishing, and chemical strengthening so as to provide a smooth non-magnetic disk substrate 110 formed of a chemically strengthened glass disk.

Layers from the adhesive layer 112 to the auxiliary recording layer 126 are sequentially deposited on the disk substrate 110 by a DC magnetron sputtering method. The medium protective layer 128 can be deposited by a CVD method. Then the lubricating layer 130 can be formed by a dip coating method. It is preferable to use an in-line deposition method from the viewpoint of high productivity. The composition of each layer will be described below.

The adhesive layer 112 is formed in contact with the disk substrate 110. The adhesive layer 112 has a function of increasing the peel strength of the soft magnetic layer 114 and the disk substrate 110, which are deposited on the adhesive layer 112, and a function of reducing the size of crystal grains in each of the layers deposited on the soft magnetic layer 114 and uniformizing those crystal grains. In a case where the disk substrate 110 is formed of amorphous glass, it is preferable to form the adhesive layer 112 of an amorphous alloy film so as to conform to a surface of the amorphous glass.

For example, the adhesive layer 112 can be selected from among a CrTi-based amorphous layer, a CoW-based amorphous layer, a CrW-based amorphous layer, a CrTa-based amorphous layer, and a CrNb-based amorphous layer. The adhesive layer 112 may include a single layer formed of a single material. Nevertheless, the adhesive layer 112 may be formed by stacking a plurality of layers. For example, a CoW layer or a CrW layer may be formed on a CrTi layer to form the adhesive layer 112.

The soft magnetic layer 114 is a layer for forming a magnetic path temporarily at the time of recording in order to pass a magnetic flux through the recording layer in a perpendicular direction according to the perpendicular magnetic recording method. The soft magnetic layer 114 can be configured to have antiferro-magnetic exchange coupling (AFC) by interposing the non-magnetic spacer layer 114b between the first soft magnetic layer 114a and the second soft magnetic layer 1140. Thus, the magnetization direction of the soft magnetic layer 114 can be aligned along the magnetic path (magnetic circuit) with high accuracy. Therefore, a component perpendicular to the magnetization direction becomes extremely small. Accordingly, noise produced from the soft magnetic layer 114 can be reduced. A cobalt-based alloy such as CoTaZr, a Co—Fe-based alloy such as CoCrFeB or CoFeTaZr, or a Ni—Fe-based alloy such as a multilayer structure of [Ni—Fe/Sn]n may be used for the first soft magnetic layer 114a and the second soft magnetic layer 114c.

The preceding underlayer 116 is formed of a non-magnetic layer, i.e., a non-magnetic alloy layer. In the present embodiment, the preceding underlayer 116 includes two non-magnetic layers of the first preceding underlayer 116a and the second preceding underlayer 116b.

The first preceding underlayer 116a is formed of amorphous Ni compound (Ni alloy). The first preceding underlayer 116a has a function of protecting the soft magnetic layer 114 from the sputtering deposition of the second preceding underlayer 116b. Specifically, provision of the first preceding underlayer 116a between the second preceding underlayer 116b and the soft magnetic layer 114 can eliminate adverse influence on the soft magnetic layer 114 from a crystalline material of the second preceding underlayer 116b and can reduce the surface roughness of the soft magnetic layer 114. Thus, the roughness of boundary surfaces of multiple layers formed on the soft magnetic layer 114 can be improved, so that the crystal orientation of those layers can be improved. Therefore, improvement of the SNR and increase of the recording density can be achieved.

Furthermore, it is preferable for the first preceding underlayer 116a to further include one or more elements selected from the group consisting of Ta, Ti, Hf, Re, Os, Ir, Mo, Nb, Zr, and V or a compound thereof. In such a case, the Ni compound of the first preceding underlayer 116a can suitably be formed into an amorphous phase.

In order to ensure formation of an amorphous phase from the Ni compound of the first preceding underlayer 116a, it is preferable to contain the aforementioned element(s) or compound thereof in a range of 40 atomic % to 60 atomic %. If the ratio of such element(s) or compound is less than 40 atomic %, then formation of an amorphous phase from the Ni compound becomes insufficient. If the ratio is higher than 60 atomic %, then the amount of Ni, which is a base of growth of crystal grains of the second preceding underlayer 116b formed on the first preceding underlayer 116a, unfavorably becomes insufficient, and it is therefore undesirable.

The second preceding underlayer 116b is formed of crystalline Ni compound. The second preceding underlayer 116b has a function of aligning the magnetization easy axis of the hexagonal close-packed structure (hcp structure) included in the underlayer 118 formed on the second preceding underlayer 116b with a direction perpendicular to the disk. It is preferable for the second preceding underlayer 116b to have a structure in which the (111) surface of the face-centered cubic structure (fcc structure) is in parallel to the principal surface of the disk substrate 110.

Furthermore, it is preferable for the second preceding underlayer 116b to further include one or more elements selected from the group consisting of W, Cr, Mo, Re, Al, Cu, and Mn or a compound thereof. In such a case, the Ni compound of the second preceding underlayer 116b can suitably be crystallized. Particularly, the atomic distance of W is closer to the atomic distance of Ru as compared to the atomic distance of Ni. Therefore, when the second preceding underlayer 116b contains W, the atomic distance of the Ni compound of the second preceding underlayer 116b can be made similar to the atomic distance of the underlayer 118 of Ru. Accordingly, it is possible to promote continuous growth of crystal grains from the second preceding underlayer 116b to the underlayer 118.

In order to ensure crystallization of the Ni compound of the second preceding underlayer 116b, it is preferable to contain the aforementioned element(s) or compound thereof in a range of 3 atomic % to 8 atomic %. If the ratio of such element(s) or compound is less than 3 atomic %, then the Ni compound shows a ferromagnetic property and it is therefore undesirable. If the ratio is higher than 8 atomic %, then the crystallization of the Ni compound becomes insufficient so that the corrosion resistance characteristics and magnetic characteristics are unfavorably deteriorated to a large extent and it is therefore undesirable.

Furthermore, for atomic distance matching with the underlayer 118, the second preceding underlayer 116b may be formed by sputtering while a bias is applied to the disk substrate 110. In this case, the crystal orientation of the underlayer 118 can be improved. Furthermore, provision of the first preceding underlayer 116a below the second preceding underlayer 116b prevents the surface layer of the soft magnetic layer 114 from being roughened even if a bias is applied during the formation of the second preceding underlayer 116b.

As described above, in the present embodiment, both of the first preceding underlayer 116a and the second preceding underlayer 116b contain Ni. Therefore, the atomic distance of the first preceding underlayer 116a can be made similar to the atomic distance of the second preceding underlayer 116b. Accordingly, crystal grains grow continuously from the first preceding underlayer 116a to the second preceding underlayer 116b, resulting in further improvement of the crystal orientation.

In the present embodiment, the second preceding underlayer 116b is formed of an alloy layer, i.e., Ni compound. However, the present invention is not limited to this example. The second preceding underlayer 116b may be formed of any crystalline material containing Ni. Therefore, the second preceding underlayer 116b may be formed solely of Ni.

The underlayer 118 has an hcp structure. The underlayer 118 has a function of allowing Co crystals of an hcp structure of the magnetic recording layer 122 to grow into a granular structure. Therefore, the orientation of the magnetic recording layer 122 can further be improved as the underlayer 118 has a higher crystal orientation, i.e., the (0001) surface of the crystals of the underlayer 118 is more parallel to the principal surface of the disk substrate 110. A typical material of the underlayer 118 is Ru. Additionally, the material of the underlayer 118 can be selected from Ru compounds such as RuCr and RuCo. Ru has an hcp structure and also has an atomic distance of crystals that is close to that of Co. Therefore, Ru can orient the magnetic recording layer 122 containing Co as a principal component in a favorable manner.

In the case where the underlayer 118 is formed of Ru, a double layer structure of Ru can be formed by changing a gas pressure during sputtering. Specifically, when the first underlayer 118a on the lower side of the underlayer 118 is to be formed, a gas pressure of Ar is set at a predetermined pressure, i.e., a low pressure. When the second underlayer 118b on the upper side of the underlayer 118 is to be formed, a gas pressure of Ar is changed so as to be higher than that for formation of the first underlayer 118a, i.e., changed into a high pressure. Thus, the crystal orientation of the magnetic recording layer 122 can be improved because of the first underlayer 118a, and the grain diameter of magnetic grains of the magnetic recording layer 122 can be reduced because of the second underlayer 118b.

Furthermore, if a gas pressure is increased, free movement paths of sputtered plasma ions are shortened. Therefore, a deposition rate is lowered, so that the film is roughened. Therefore, separation and size reduction of the Ru crystal grains can be promoted, and the size of the Co crystal grains can also be reduced.

Moreover, a small amount of oxygen may be added to Ru of the underlayer 118. In this case, separation and size reduction of the Ru crystal grains can further be promoted, resulting in further isolation and size reduction of the magnetic recording layer 122. Therefore, in the present embodiment, oxygen is contained in the second underlayer 118b of the underlayer 118, which is formed right below the magnetic recording layer 122. In other words, the second underlayer 118b is formed of RuO. In this case, the aforementioned advantages can be obtained most effectively. Oxygen may be added by reactive sputtering. Nevertheless, it is preferable to use a target containing oxygen during the sputtering deposition.

The magnetic recording layer 122 has a granular column structure in which non-magnetic substance is segregated around magnetic grains (crystal grains) of a hard magnetic material selected from among Co-based alloy, Fe-based alloy, and Ni-based alloy so as to form grain boundaries. In the present embodiment, the magnetic recording layer 122 includes the lower recording layer 122a, the interposition layer 122b, the first primary recording layer 122c, and the second primary recording layer 122d. Therefore, small crystal grains of the first primary recording layer 122c and the second primary recording layer 122d grow continuously from crystal grains (magnetic grains) of the lower recording layer 122a. Accordingly, the primary recording layer can be reduced in size, and the SNR can be improved.

In the present embodiment, the lower recording layer 122a employs CoCrPt—$Cr_2O_5$, which segregates non-magnetic substance of $Cr_2O_5$ (oxide) around magnetic grains of CoCrPt so as to form grain boundaries for thereby forming a granular structure in which the magnetic grains have grown into a columnar shape.

The interposition layer 122b is formed of a non-magnetic thin film. Magnetic continuity between the lower recording layer 122a and the first primary recording layer 122c is interrupted by providing the interposition layer 122b between the lower recording layer 122a and the first primary recording layer 122c. In this case, when the interposition layer 122b has a predetermined film thickness (0.7 nm to 0.9 nm), antiferromagnetic exchange coupling (AFC) is produced between the lower recording layer 122a and the first primary recording layer 122c. Therefore, the layer above the interposition layer 122b and the layer below the interposition layer 122b are attracted to each other in magnetization so as to affect each other for fixing directions of magnetization. Accordingly, fluctuation of the magnetization axis is reduced, so that noise can be reduced.

The interposition layer 122b may be formed of Ru or Ru compound. The atomic distance of Ru is close to that of Co, which constitutes the magnetic grains. Therefore, Ru is unlikely to inhibit epitaxial growth of the Co crystal grains even though it is interposed in the magnetic recording layer 122. Furthermore, the interposition layer 122b is also unlikely to inhibit the epitaxial growth because it is extremely thin.

If the interposition layer 122b is not provided, the lower recording layer 122a would be a magnet continuous to the first primary recording layer 122c and the second primary recording layer 122d. However, the first primary recording layer 122c and the second primary recording layer 122d are separated from each other by the interposition layer 122b. Therefore, the lower recording layer 122a, the first primary recording layer 122c, and the second primary recording layer 122d become separate short magnets. When the film thickness of the lower recording layer 122a is reduced, the aspect ratio of the granular magnetic grains is reduced. In a perpendicular magnetic recording medium, the film thickness direction is the longitudinal direction of the magnetization easy axis. Therefore, a strong demagnetizing field is generated within the magnet. Thus, although the lower recording layer 122a is formed of a hard magnetic material, the magnetic field outputted from the lower recording layer 122a is reduced and is unlikely to be picked up by a magnetic head. In other words, when a magnetic moment (attraction of the magnet) is set by adjusting the film thickness of the lower recording layer 122a such that a magnetic flux is unlikely to reach the magnetic head and that the lower recording layer 122a has magnetic interaction with respect to the first primary recording layer 122c, the magnetic recording layer can exhibit a high magnetic coercive force with less noise.

In the present embodiment, the first primary recording layer 122c employs CoCrPt—$SiO_2$—$TiO_2$. In such a case, non-magnetic substance of $SiO_2$ and $TiO_2$ (composite oxide) is segregated around magnetic grains of CoCrPt so as to form grain boundaries for thereby forming a granular structure in which the magnetic grains have grown into a columnar shape in the first primary recording layer 122c.

In the present embodiment, the second primary recording layer 122d is formed continuously on the first primary recording layer 122c. However, the second primary recording layer 122d and the first primary recording layer 122c have different compositions and film thicknesses. The second primary recording layer 122d employs CoCrPt—$SiO_2$—$TiO_2$—$Co_3O_4$. In such a case, non-magnetic substance of $SiO_2$, $TiO_2$, and $Co_3O_4$ (composite oxide) is segregated around magnetic grains of CoCrPt so as to form grain boundaries for thereby forming a granular structure in which the magnetic grains have grown into a columnar shape in the second primary recording layer 122d.

As described above, the second primary recording layer 122d of the present embodiment includes a larger amount of oxide as compared to the first primary recording layer 122c.

Therefore, separation of the crystal grains can be promoted gradually from the first primary recording layer 122c to the second primary recording layer 122d.

Furthermore, as described above, the second primary recording layer 122d contains a Co oxide. If $SiO_2$ or $TiO_2$ is added as oxide, oxygen deficiency will occur. Therefore, Si ions or Ti ions are mixed into the magnetic grains so as to disturb the crystal orientation and to lower the magnetic coercive force (Hc). Thus, the contained Co oxide can function as an oxide support for compensation of the oxygen deficiency. Examples of the Co oxide include $Co_3O_4$. Nevertheless, CoO may be used as the Co oxide.

The Co oxide has a higher Gibbs free energy ΔG than $SiO_2$ and $TiO_2$. Therefore, Co ions and oxygen ions are likely to be separated from each other. Accordingly, oxygen is preferentially separated from the Co oxide. Thus, oxygen deficiency caused to $SiO_2$ or $TiO_2$ is compensated such that ions of Si or Ti are completed as an oxide and can be deposited at the grain boundaries. In this case, foreign matter such as Si or Ti is prevented from mixing into the magnetic grains and thus disturbing the crystallinity of the magnetic grains. At that time, excess Co ions may be mixed into the magnetic grains. However, magnetic characteristics are not deteriorated because the magnetic grains are formed of Co alloy. Therefore, the crystallinity and the crystal orientation of the magnetic grains are improved so as to increase the magnetic coercive force (Hc). Furthermore, since the saturation magnetization (Ms) is improved, the overwrite performance is also advantageously improved.

If Co oxide is added to all of the magnetic recording layers, the SNR is problematically lowered. Therefore, no Co oxide is added to the first primary recording layer 122c as described above. In this case, while a high SNR can be maintained because of the first primary recording layer 122c, a high magnetic coercive force (Hc) and overwrite performance can be obtained because of the second primary recording layer 122d. The second primary recording layer 122d preferably has a film thickness larger than the first primary recording layer 122c. In a preferred example, the first primary recording layer 122c has a thickness of 2 nm, and the second primary recording layer 122d has a thickness of 8 nm.

The aforementioned materials for the lower recording layer 122a, the first primary recording layer 122c, and the second primary recording layer 122d are mere examples. The present invention is not limited to those examples. Examples of the non-magnetic substance for forming grain boundaries include oxides such as silicon oxide ($SiO_x$), chromium oxide ($Cr_xO_y$), titanium oxide ($TiO_2$), zirconium oxide ($ZrO_2$), tantalum oxide ($Ta_2O_5$), iron oxide ($Fe_2O_3$), and boron oxide ($B_2O_3$). Furthermore, nitrides such as BN and carbides such as $B_4C_3$ may also suitably be used.

In the present embodiment, each of the lower recording layer 122a and the first primary recording layer 122c employs two kinds of non-magnetic substances (oxides), and the second primary recording layer 122d employs three kinds of non-magnetic substances (oxides). However, the present invention is not limited to this example. For example, all or some of the layers from the lower recording layer 122a to the second primary recording layer 122d may employ one kind of non-magnetic substance or two or more non-magnetic substances in a composite manner. The types of the non-magnetic substances are not limited to specific ones. Nevertheless, it is preferable to include $SiO_2$ and $TiO_2$ as in this embodiment. Therefore, if the layers from the lower recording layer 122a to the second primary recording layer 122d are formed of only one layer unlike the present embodiment (i.e., no interposition layer 122b is provided), then it is preferable to form the magnetic recording layer of $CoCrPt$—$SiO_2$—$TiO_2$.

The separation layer 124 is a non-magnetic layer provided between the magnetic recording layer 122 (the second primary recording layer 122d) and the auxiliary recording layer 126. The separation layer 124 is formed with a thickness larger than that of the interposition layer 122b. With this configuration, ferro-magnetic exchange coupling, not anti-ferro-magnetic exchange coupling, is produced as magnetic effects between the magnetic recording layer 122 and the auxiliary recording layer 126. Therefore, the magnetic recording layer 122 serves as a pinned layer (a fixed magnetic direction layer) with respect to the auxiliary recording layer 126 so as to reduce noise caused by the auxiliary recording layer 126 and to improve the SNR.

Furthermore, in the present embodiment, the separation layer 124 may be formed of a thin film including Ru, Ru compound, Ru and oxygen, or Ru and oxide. With this configuration, noise caused by the auxiliary recording layer 126 can be reduced. When the separation layer 124 is formed, oxygen included in the separation layer 124 is segregated on oxide of the magnetic recording layer 122, so that Ru is segregated on the magnetic grains. Therefore, Co of the auxiliary recording layer 126 inherits the Co crystal structure of the magnetic recording layer 122.

Various kinds of oxides may be included along with Ru in the separation layer 124. Particularly, use of oxides of W, Ti, and Ru can improve the electromagnetic characteristics (SNR). For example, the separation layer 124 may be formed of RuO, $RuWO_3$, or $RuTiO_2$. Among other things, $WO_3$ is highly effective.

Conceivably, this is because oxygen included along with Ru is dissociated in the sputters so that the dissociated oxygen exhibits effects of oxygen addition. In other words, use of $WO_3$ can suitably provide both effects of oxygen addition and oxide addition. Other examples of the oxide include oxides such as silicon oxide ($SiO_x$), chromium oxide ($Cr_xO_y$), titanium oxide ($TiO_2$), zirconium oxide ($ZrO_2$), tantalum oxide ($Ta_2O_5$), iron oxide ($Fe_2O_3$), and boron oxide ($B_2O_3$). Furthermore, nitrides such as BN and carbides such as $B_4C_3$ may also suitably be used.

The auxiliary recording layer 126 is a magnetic layer that is substantially magnetically continuous in the in-plane direction of the principal surface of the substrate. The auxiliary recording layer 126 should be adjacent to or close to the magnetic recording layer 122 in order to have magnetic interaction with the magnetic recording layer 122. For example, the auxiliary recording layer 126 may be formed by CoCrPt or CoCrPtB, or by adding a small amount of oxide to CoCrPt or CoCrPtB. The auxiliary recording layer 126 is provided in order to adjust the reversed domain nucleation magnetic field (Hn), to adjust the magnetic coercive force (He), and thus to improve the thermal fluctuation characteristics, the OW performance, and the SNR. For those purposes, it is preferable for the auxiliary recording layer 126 to have high perpendicular magnetic anisotropy (Ku) and saturation magnetization (Ms). In the present embodiment, the auxiliary recording layer 126 is provided above the magnetic recording layer 122. Nevertheless, the auxiliary recording layer 126 may be provided below the magnetic recording layer 122.

Here, "magnetically continuous" refers to that the magnetism is continuous, and "substantially continuous" refers to that the auxiliary recording layer 126 may not be one magnet as viewed as a whole and that the magnetism may be discontinuous because of grain boundaries of crystal grains or the like. Discontinuous grain boundaries may be generated not only by discontinuous crystals, but also by segregated Cr.

Furthermore, a small amount of oxide may be included and segregated. Even if grain boundaries containing oxide are formed in the auxiliary recording layer 126, the area of the grain boundaries of the auxiliary recording layer 126 is preferably smaller than that of the grain boundaries of the magnetic recording layer 122. In other words, the oxide content of the grain boundaries of the auxiliary recording layer 126 is preferably lower than that of the grain boundaries of the magnetic recording layer 122. The function and mechanism of the auxiliary recording layer 126 are not necessarily clear. It is conceivable that the auxiliary recording layer 126 exhibits magnetic interaction (exchange coupling) with granular magnetic grains of the magnetic recording layer 122 so that Hn and He can be adjusted. Therefore, the resistance to thermal fluctuation and the SNR can be improved. Furthermore, crystal grains connected to the granular magnetic grains (crystal grains having magnetic interaction) have a larger area than a cross-section of the granular magnetic grains. Therefore, those crystal grains are subjected to a large amount of magnetic flux from the magnetic head so that flux reversal is likely to occur. Thus, the overall OW performance is improved.

The medium protective layer 128 can be formed by a CVD method to deposit carbon while a vacuum is maintained. The medium protective layer 128 is a protective layer for protecting the perpendicular magnetic recording medium 100 against impact from the magnetic head. Generally, carbon deposited by a CVD method is improved in film hardness as compared to carbon deposited by a sputtering method. Therefore, the medium protective layer 128 can protect the perpendicular magnetic recording medium 100 more effectively against impact from the magnetic head.

The lubricating layer 130 can be formed of perfluoropolyether (PFPE) by a dip coating method. PFPE has a molecular structure of a long chain and is coupled to N atoms on a surface of the medium protective layer 128 with high affinity. The lubricating layer 130 serves to prevent damage or defect of the medium protective layer 128 even if the magnetic head is brought into contact with a surface of the perpendicular magnetic recording medium 100.

The perpendicular magnetic recording medium 100 is obtained by the above manufacturing process. Some examples of the present invention will be described below.

Examples

Layers from the adhesive layer 112 to the auxiliary recording layer 128 were sequentially formed on the disk substrate 110 under an Ar atmosphere with an evacuated deposition apparatus by a DC magnetron sputtering method. The adhesive layer 112 was formed of Cr-50Ti with a thickness of 10 nm. For the soft magnetic layer 114, the spacer layer 114b was formed with a thickness of 0.7 nm between the first soft magnetic layer 114a and the second soft magnetic layer 114c. The first soft magnetic layer 114a and the second soft magnetic layer 114c were formed of 92(40Fe-60Co)-3Ta-5Zr with a thickness of 20 nm. The composition of the preceding underlayer 116 (the first preceding underlayer and second preceding underlayer) will be described later. The first underlayer 118a was formed of a Ru film having a thickness of 10 nm under an Ar atmosphere at 0.6 Pa. The second underlayer 118b was formed of a Ru(RuO) film including oxygen with a thickness of 10 nm under an Ar atmosphere at 5 Pa by using a target containing oxygen. The lower recording layer 122a was formed of 90(70Co-10Cr-20Pt)-10($Cr_2O_3$) with a thickness of 2 nm at 3 Pa. The interposition layer 122b was formed of Ru with a thickness of 0.4 nm to 0.5 nm. The first primary recording layer 122c was formed of 90(72Co-10Cr-18Pt)-5($SiO_2$)-5($TiO_2$) with a thickness of 12 nm at 3 Pa. The second primary recording layer 122d was formed of 90(72Co-12Cr-16Pt)-4.5($SiO_2$)-4.5($TiO_2$)-1($Co_3O_4$) with a thickness of 12 nm at 3 Pa. The separation layer 124 was formed of $RuWO_3$ with a thickness of 0.3 nm. The auxiliary recording layer 126 was formed of 62Co-18Cr-15Pt-5B with a thickness of 6 nm. The medium protective layer 128 was formed with a thickness of 4 nm by a CVD method using $C_2H_4$ and CN. The lubricating layer 130 was formed by a dip coating method using PFPE.

FIG. 2 is a table showing variation of characteristics with respect to materials. The materials used for the first preceding underlayer 116a, the second preceding underlayer 116b, and the first underlayer 118a are shown in FIG. 2. The compositional ratios of those materials are shown by values added to the symbols of the elements. Specifically, in Examples 1 to 3, the second preceding underlayer 116b was formed of 97Ni-3W. In Example 1, the first preceding underlayer 116a was formed of 45Ni-55Ta. In Example 2, the first preceding underlayer 116a was formed of 50Ni-50Ti. In Example 3, the first preceding underlayer 116a was formed of 45Ni-55Ta, and the first underlayer 118a was formed of 90Ru-10Cr instead of Ru. In Comparative Example 1, the first preceding underlayer 116a was formed of 45Ni-55Ta, and no second preceding underlayer 116b was provided. In Comparative Example 2, no first preceding underlayer 116a was provided, and the second preceding underlayer 116b was formed of 97Ni-3W. If a ratio of additives in a Ni compound is equal to or higher than about 40 atomic %, the Ni compound is formed into an amorphous phase. Therefore, the first preceding underlayer 116a was amorphous in Examples 1 to 3 and Comparative Examples 1 and 2.

In FIG. 2, Ra refers to the surface roughness of the soft magnetic layer 114, i.e., the roughness of the boundary surface between the soft magnetic layer 114 and the first preceding underlayer 116a, measured with an atomic force microscope (AFM). A larger value of Ra means that the boundary surface was rougher. In FIG. 2, $\Delta\theta50$ refers to the crystal orientation of crystal grains measured by a rocking curve method using an X-ray diffraction apparatus. This value is an orientation variance (c-axis dispersion angle) representing the magnitude of variation in the orientation of the crystal grains. A smaller value of $\Delta\theta50$ means that the crystal grains have better orientation. Hc represents the magnetic coercive force, which is a kind of magnetostatic characteristics. As Hc of the magnetic recording layer 122 increases, the direction of magnetization is less likely to reverse in the magnetic recording layer 122 so as to improve the signal storage performance of the perpendicular magnetic recording medium 100. Furthermore, Ho is needed to hold data with a track width, which has been narrowed along with increase of the recording density. Hn represents the reversed domain nucleation magnetic field. The resistance to a thermal fluctuation phenomenon increases as an absolute value of Hn becomes larger. The SNR means a signal-to-noise ratio, which is a kind of electromagnetic characteristics. The SNR represents an intensity ratio of signals and noise and is important to read and write data accurately at a high speed even with recording bits having a small area.

As shown in FIG. 2, comparison of Examples and Comparative Examples reveals that the crystal orientation ($\Delta\theta50$) of crystal grains was better in all of Examples as compared to Comparative Examples and that a high SNR could be obtained in all of Examples. As shown in Examples 1 and 2, the SNR higher than 18.0 dB, which has been required to increase the recording density, could be obtained by including Ta or Ti in the first preceding underlayer 116a. Additionally, it can be seen from Example 3 that Ru compound could also suitably be used for the first underlayer 118a instead of Ru.

Furthermore, it can be seen from Comparative Example 1 that the roughness (surface roughness) of the boundary surface could be reduced by using amorphous Ni compound (NiTa). In this case, however, Comparative Example 1 did not include the second preceding underlayer 116b of crystalline Ni compound. Therefore, the magnetic characteristics (Ho, Hn, and SNR) could not be maintained. Moreover, since Comparative Example 2 included the second preceding underlayer 116b of crystalline Ni compound, magnetic characteristics other than the SNR could be maintained to some extent. In this case, however, Comparative Example 2 did not include the first preceding underlayer 116a having an amorphous phase. Therefore, the roughness (surface roughness Ra) of the boundary surface increased so as to deteriorate the crystal orientation of the crystal grains. Thus, an SNR (higher than 18.0 dB) that can achieve a high recording density could not be obtained.

As can be seen from the above results, when the perpendicular magnetic recording medium 100 includes the first preceding underlayer 116a of an amorphous Ni compound and the second preceding underlayer 116b of a crystalline Ni compound, reduction of the roughness of the boundary surface, improvement of the crystal orientation, and hence improvement of the SNR can be achieved by optimizing the material of the first preceding underlayer 116a.

Figures 3A, 3B:
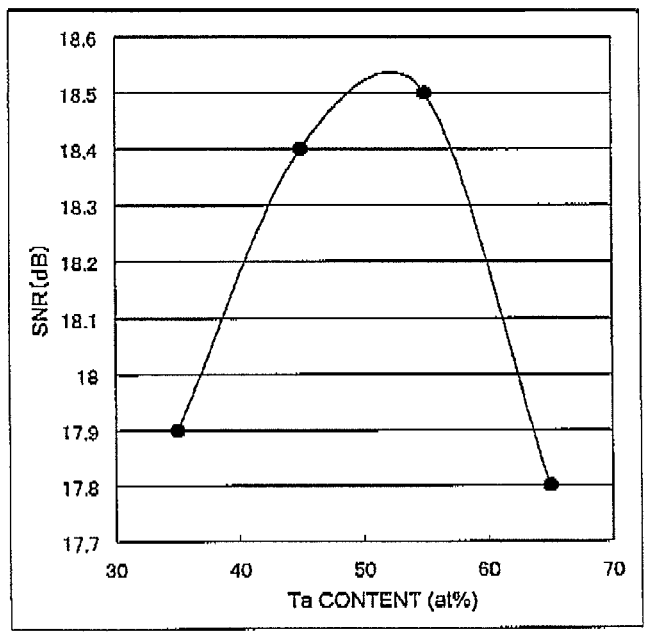
FIGS. 3A and 3B show variation of characteristics with respect to the compositional ratio of a first preceding underlayer.

FIGS. 3A and 3B show variation of characteristics with respect to the compositional ratio of the first preceding underlayer 116a. FIG. 3A is a table showing changes of characteristics when the compositional ratio of the first preceding underlayer 116a was varied based upon Example 1 of FIG. 2. FIG. 3B is a graph showing the relationship between the compositional ratio and the SNR. The notation of materials used for the first preceding underlayer 116a, the second preceding underlayer 116b, and the first underlayer 118a and compositional ratios thereof is the same as in FIG. 2. The explanation of respective parameters is omitted to avoid the redundancy.

As shown in FIG. 3A, the compositional ratio of Ni and Ta of the first preceding underlayer 116a was varied around the compositional ratio of Example 1. Specifically, the second preceding underlayer 118b was formed of 97Ni-3W in Examples 1, 4, 5, and 6. The first preceding underlayer 116a was formed of 65Ni-35Ta in Example 4, formed of 55Ni-45Ta in Example 5, formed of 45Ni-55Ta in Example 1, and formed of 35Ni-65Ta in Example 6.

Referring to FIG. 3A, when the Ta content of the first preceding underlayer 116a exceeded 35 atomic % (Example 4), the surface roughness of the boundary surface was reduced, and the crystal orientation was improved. As a result, various kinds of magnetic characteristics were also improved. When the Ta content was further increased (Examples 5 and 1), the magnetic characteristics peaked at the Ta content of 55 atomic % (Example 1). When the Ta content was still further increased, the magnetic characteristics were deteriorated (Example 6). From this result, it can be seen that excellent magnetic characteristics can suitably be maintained by adjusting the Ta content of the first preceding underlayer 116a within an appropriate range.

Referring to FIG. 3B, it can be seen that the Ta content of the first preceding underlayer 116a should be in a range of about 40 atomic % to about 60 atomic % in order to meet the conditions of the SNR that is equal to or higher than 18.0 dB, which has been required to increase the recording density. When the Ta content was lower than 40 atomic % (Example 4), the first preceding underlayer 116a was insufficiently formed into an amorphous phase so that the soft magnetic layer 114 could not satisfactorily be protected from the second preceding underlayer 116b. Therefore, the roughness (surface roughness Ra) of the boundary surface was increased, and magnetic characteristics that have been required to increase the recording density could not be obtained. Furthermore, when the Ta content was higher than 60 atomic % (Example 6), the amount of Ni contained in the first preceding underlayer 116a became insufficient so as to inhibit continuous growth of Ni crystal grains of the second preceding underlayer 116b formed on the first preceding underlayer 116a. Thus, the magnetic characteristics were deteriorated.

Figures 4A, 4B:
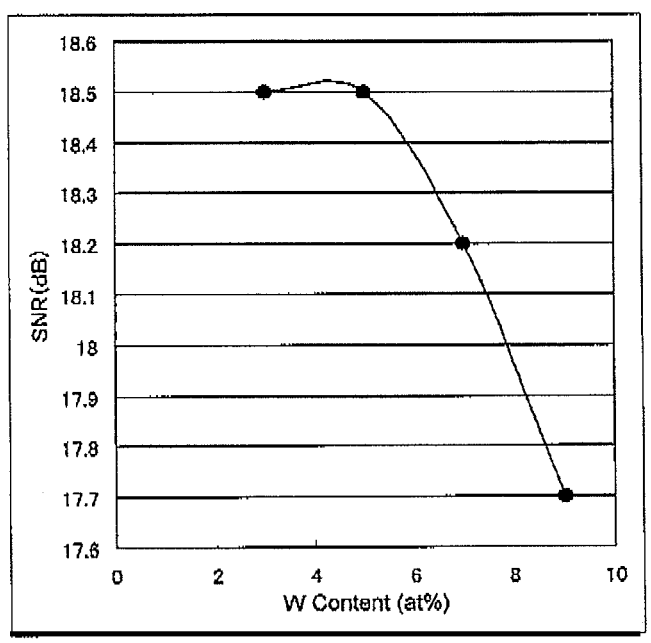
FIGS. 4A and 4B show variation of characteristics with respect to the compositional ratio of a second preceding underlayer.

FIGS. 4A and 4B show variation of characteristics with respect to the compositional ratio of the second preceding underlayer 116b. FIG. 4A is a table showing variation of characteristics when the compositional ratio of the second preceding underlayer 116b was varied based upon Example 1 of FIG. 2. FIG. 4B is a graph showing the relationship between the compositional ratio and the SNR. The notation of materials used for the first preceding underlayer 116a, the second preceding underlayer 116b, and the first underlayer 118a and compositional ratios thereof is the same as in FIG. 2. The explanation of respective parameters is omitted to avoid the redundancy.

As shown in FIG. 4A, the compositional ratio of Ni and W of the second preceding underlayer 116b was varied based on Example 1. Specifically, the first preceding underlayer 116a was formed of 45Ni-55Ta in Examples 1, 7, 8, and 9. The second preceding underlayer 116b was formed of 97Ni-3W in Example 1, formed of 95Ni-5W in Example 7, formed of 93Ni-7W in Example 8, and formed of 91 Ni-9W in Example 9.

Referring to FIG. 4A, when the W content of the second preceding underlayer 116b was increased from 3 atomic % (Example 1), the magnetic characteristics were gradually deteriorated (Examples 7 and 8). When the W content exceeded 9 atomic %, the SNR did not meet a desired value (equal to or higher than 18.0 dB).

Referring to FIG. 4B, it can be seen that the upper limit of the W content of the second preceding underlayer 116b is about 8 atomic % in order to meet the conditions of the SNR that is equal to or higher than 18.0 dB, which has been required to increase the recording density. Therefore, the W content of the second preceding underlayer 116b should be in an appropriate range of about 3 atomic % to about 8 atomic %. Within this range, the atomic distance matching of the second preceding underlayer 116b and the first underlayer 118a is improved so that the SNR is improved. If the W content is lower than 3 atomic %, the second preceding underlayer 116b unfavorably shows a ferromagnetic property. If the W content is higher than 8 atomic %, the second preceding underlayer 116b is formed into an amorphous phase, so that it is difficult to maintain the magnetic characteristics as described above.

As described above, according to the present embodiment, the crystal orientation is improved by reducing the roughness of the boundary surface between the preceding underlayer 116 (the first preceding underlayer 116a) and the soft magnetic layer 114 (the first soft magnetic layer 114a). The SNR is improved by improving the atomic distance matching of the preceding underlayer 116 (the second preceding underlayer 116b) and the underlayer 118 (the first underlayer 118a). Accordingly, the recording density can further be increased.

Second Embodiment

The inventors have found that a boundary surface between a non-magnetic layer and a soft magnetic layer tends to be roughened if a bias voltage is applied to a substrate when the non-magnetic layer is formed on the soft magnetic layer (on sputtering). Therefore, the inventors considered forming a non-magnetic layer without application of a bias voltage. However, application of a bias voltage during the formation of the non-magnetic layer is performed for improvement of magnetostatic characteristics (particularly the magnetic coercive force (Hc)). Therefore, characteristics are considerably deteriorated if no bias voltage is applied. Accordingly, application of a bias voltage is required during the formation of the non-magnetic layer.

The inventors have continuously studied and have considered interposing a layer between a non-magnetic layer and a soft magnetic layer formed below the non-magnetic layer for protecting the soft magnetic layer. The inventors have considered that this layer can eliminate adverse influence on the soft magnetic layer from the non-magnetic layer and can remarkably improve the crystal orientation. The inventors produced a perpendicular magnetic recording medium by using this technique and evaluated the SNR of the perpendicular magnetic recording medium.

The SNR of the perpendicular magnetic recording medium produced by using the above technique was improved along with improvement of the crystal orientation. However, the SNR decreased after the crystal orientation reached a certain level. As a result of careful examination of the perpendicular magnetic recording medium for elucidating the cause, the inventors have found that crystal grains (magnetic grains) of a magnetic recording layer become larger along with improvement of the crystal orientation and that the SNR decreases due to increase of noise in a magnetic transition region after the crystal grains reach a certain level of size.

Therefore, the inventors have thought it difficult to drastically improve the SNR merely by improvement of the crystal orientation. The inventors have thought that there is a limit to improvement of the SNR only using the above technique. As a result of further examination, the inventors have found that the crystal orientation can be improved by reducing the size of crystal grains of a magnetic recording layer along with the above technique and that the crystal grains of the magnetic recording layer are accordingly prevented from increasing in size so that the SNR can drastically be improved.

In the present embodiment, there will be described that the second non-magnetic layer is formed of a crystalline material having an fcc structure. This relates to the fact that the magnetic recording layer is formed of Co-based alloy, which grows into a columnar shape and forms magnetic crystal grains, and a plurality of oxides, which form non-magnetic grain boundaries between the crystal grains.

Portions that differ from the first embodiment or portions that should be explained in greater detail will be described below. This is to omit the redundant explanation.

The first preceding underlayer 116a is formed of an amorphous material. The first preceding underlayer Ilea has a function of protecting the soft magnetic layer 114 from the sputtering deposition of the second preceding underlayer 116b. Specifically, an amorphous material has hardness higher than a crystalline material. Therefore, when the first preceding underlayer 116a that is formed of an amorphous material is provided between the second preceding underlayer 116b and the soft magnetic layer 114, the soft magnetic layer 114 can suitably be protected from impact of formation of the conventional non-magnetic layer (second preceding underlayer 116b) by the hard film (the first preceding underlayer 116a). Accordingly, adverse influence on the soft magnetic layer 114 can be eliminated at the time of the formation of the second preceding underlayer 116b, and the surface roughness of the soft magnetic layer 114 can be reduced. Thus, the roughness of boundary surfaces of multiple layers formed on the soft magnetic layer 114 can be improved. Thus, the crystal orientation of those layers can be improved. As a result, improvement of the SNR and increase of the recording density can be achieved.

In the present embodiment, the first preceding underlayer 116a is preferably formed of one or more elements selected from the group consisting of Ni, Fe, Co, Cu, Zn, Pd, and Pt or a compound thereof. In such a case, the first preceding underlayer 11 ea can protect the soft magnetic layer 114 more effectively, so that the surface roughness of the soft magnetic layer 114 can further be reduced.

Furthermore, it is preferable for the first preceding underlayer 116a to further include one or more elements selected from the group consisting of Ta, Ti, Hf, Re, Os, Ir, Mo, Nb, Zr, and V or a compound thereof. In such a case, the first preceding underlayer 116a can suitably be formed into an amorphous phase. In order to ensure formation of an amorphous phase of the first preceding underlayer 116a, it is preferable to contain the aforementioned element(s) or compound thereof in a range of 40 atomic % to 60 atomic %. If the ratio of such element(s) or compound is less than 40 atomic %, it is undesirable because formation of an amorphous phase becomes insufficient. If the ratio is higher than 60 atomic %, it is undesirable because the amount of Ni, Fe, Co, Cu, Zn, Pd, or Pt, which is a base of growth of crystal grains of the second preceding underlayer 116b formed on the first preceding underlayer 116a, unfavorably becomes insufficient.

The second preceding underlayer 116b is formed of a crystalline material. The second preceding underlayer 116b has a function of preventing corrosion deposition from the soft magnetic layer 114 and a function of maintaining good magnetic characteristics. Furthermore, the second preceding underlayer 116b also has a function of aligning the magnetization easy axis of the hexagonal close-packed structure (hcp structure) included in the underlayer 118 formed on the second preceding underlayer 116b with a direction perpendicular to the disk. Therefore, it is preferable for the crystalline material of the second preceding underlayer 116b to have an fcc structure. In such a case, crystal grains of the underlayer 118 having an hcp structure grow on the (111) surface of the fcc structure of the second preceding underlayer 116b, so that the magnetization easy axis of the underlayer 118 can be oriented to the perpendicular direction. Accordingly, noise can be reduced, and the SNR can further be improved. The (111) surface of the face-centered cubic structure (fcc structure) of the second preceding underlayer 116b is preferably in parallel to the principal surface of the disk substrate 110.

In the present embodiment, the second preceding underlayer 116b is preferably formed of one or more elements selected from the group consisting of Ni, Co, Cu, Cr, Y, and Ag or a compound thereof. In such a case, the corrosion resistance characteristics and the magnetic characteristics of the second preceding underlayer 116b can further be improved.

Furthermore, it is preferable for the second preceding underlayer 116b to further include one or more elements selected from the group consisting of W, Cr, Mo, Re, Al, Cu, and Mn or a compound thereof. In such a case, the second preceding underlayer 116b can suitably be non-magnetized and crystallized. Particularly, the atomic distance of W is closer to the atomic distance of Ru as compared to the atomic distance of Ni. Therefore, when the second preceding underlayer 116b contains W, the atomic distance of the second preceding underlayer 116b can be made similar to the atomic distance of the underlayer 118 of Ru in the case where Ni is used for the second preceding underlayer 116b. Accordingly, it is possible to promote continuous growth of crystal grains from the second preceding underlayer 116b to the underlayer 118.

In order to ensure crystallization of the second preceding underlayer 116b, it is preferable to contain the aforementioned element(s) or compound thereof in a range of 3 atomic % to 8 atomic %. If the ratio of such element(s) or compound is less than 3 atomic %, it is undesirable because the second preceding underlayer 116b shows a ferromagnetic property. If the ratio is higher than 8 atomic %, it is undesirable because the crystallization of the second preceding underlayer 116b becomes insufficient so that the corrosion resistance characteristics and magnetic characteristics are unfavorably deteriorated to a large extent.

Furthermore, for atomic distance matching with the underlayer 118, the second preceding underlayer 116b may be formed by sputtering while a bias is applied to the disk substrate 110. In this case, the crystal orientation of the underlayer 118 can be improved. Furthermore, provision of the first preceding underlayer 116a below the second preceding underlayer 116b prevents the surface layer of the soft magnetic layer 114 from being roughened even if a bias is applied during the formation of the second preceding underlayer 116b.

In the present embodiment, the magnetic recording layer 122 (the lower recording layer 122a) is formed of Co-based alloy that grows into a columnar shape and forms crystal grains (magnetic grains) and a plurality of oxides (composite oxide) that form non-magnetic grain boundaries between the crystal grains. With this configuration, characteristics of a plurality of oxides can be obtained. Therefore, size reduction and isolation of the crystal grains (magnetic grains) of the lower recording layer 122a (the magnetic recording layer 122) can further be promoted as compared to a case where grain boundaries are formed by one kind of oxide. Accordingly, size increase of the crystal grains of the magnetic recording layer 122 (particularly the lower recording layer 122a), which would be caused by improvement of the crystal orientation due to the interposition of the first preceding underlayer 116a, is prevented. Consequently, the SNR is not lowered even if the crystal orientation is remarkably improved. As a result, the SNR can drastically be improved, and further increase of the recording density of the perpendicular magnetic recording medium 100 can be achieved.

The oxides preferably include an oxide of an element selected from the group consisting of Si, Ti, Cr, Co, Ta, Ru, and Cu. In such a case, it is possible to further promote size reduction and isolation of the crystal grains of the lower recording layer 122a. Particularly, $SiO_2$, which is an oxide of Si, can promote size reduction and isolation of the magnetic grains most effectively. Furthermore, $TiO_2$, which is an oxide of Ti, has a property of improving the electromagnetic characteristics (particularly the SNR). Thus, it is most preferable to use $SiO_2$ and $TiO_2$ as a plurality of oxides that form grain boundaries of the lower recording layer 122a.

There will be described some examples in which $SiO_2$ and $TiO_2$ were used as a plurality of oxides, i.e., examples in which the lower recording layer 122a is formed of CoCrPt—$SiO_2$—$TiO_2$. In the examples of CoCrPt—$SiO_2$—$TiO_2$, $SiO_2$ and $TiO_2$ (oxides), which are non-magnetic substance, were segregated around magnetic grains of CoCrPt, which is a Co-based alloy, so as to form grain boundaries, and the magnetic grains grew into a columnar shape to form a granular structure.

Examples

There will be described Examples of the present invention and Comparative Examples. Parts of Examples and Comparative Examples in the second embodiment that are not described below were produced with the same composition, with the same film thickness, or under the same deposition conditions as in the first embodiment.

FIG. 5 is a table showing variation of characteristics with respect to the materials of the first preceding underlayer 116a and the lower recording layer 122a. In Example 21 of FIG. 5, the first preceding underlayer 116a was formed of 50Cr-50Ta, and the lower recording layer 122a was formed of 95(72Co-10Cr-18Pt)-2.5($SiO_2$)-2.5($TiO_2$). In Example 22, the first preceding underlayer 116a was formed of 50Ni-50Ta, and the lower recording layer 122a was formed of the same material as the Example 21. In Comparative Example 21, no first preceding underlayer 116a was provided, and the lower recording layer 122a was formed of the same material as the Example 21. In Comparative Example 22, no first preceding underlayer 116a was provided, and the lower recording layer 122a was formed of 95(72Co-10Cr-18Pt)-5($SiO_2$). In Comparative Example 23, the first preceding underlayer 116a was formed of 50Cr-50Ta, and the lower recording layer 122a was formed of the same material as the Comparative Example 22. In Comparative Example 24, the first preceding underlayer 116a was formed of 50Ni-50Ta, and the lower recording layer 122a was formed of the same material as the Comparative Example 22. In all of Examples and Comparative Examples, the second preceding underlayer 116b was formed of 95Ni-5W.

In FIG. 5, $\Delta\theta 50$ (Ru) refers to the crystal orientation of Ru crystal grains of the underlayer 118 measured by a rocking curve method using an X-ray diffraction apparatus (XRD). This value is an orientation variance (c-axis dispersion angle) representing the magnitude of variation in the orientation of the crystal grains. A smaller value of $\Delta\theta 50$ means that the crystal grains have better orientation. Hc represents the magnetic coercive force, which is a kind of magnetostatic characteristics. The grain diameter is the diameter of crystal grains of the lower recording layer 122a measured with a transmission electron microscope (TEM). A smaller value of the grain diameter means that the crystal grains are smaller and have been reduced in size. The SNR represents an intensity ratio of signals and noise and is important to read and write data accurately at a high speed even with recording bits having a small area.

As can be seen from comparison of Examples 21 and 22 and Comparative Examples 21 and 22 of FIG. 5, $\Delta\theta 50$ (Ru) was smaller in Examples 21 and 22 than in Comparative Examples 21 and 22. Therefore, a high SNR was obtained in Examples 21 and 22. Thus, it can be seen that provision of the first preceding underlayer 116a between the soft magnetic layer 114 and the second preceding underlayer 116b as in Examples 21 and 22 can eliminate adverse influence on the soft magnetic layer 114 at the time of the formation of the second preceding underlayer 116b and can also improve the crystal orientation of the soft magnetic layer 114 and the layer formed on the soft magnetic layer 114, particularly the underlayer 118. It can be seen that the SNR can thus be improved.

As can be seen from comparison of Example 21 and Comparative Example 23 and comparison of Example 22 and Comparative Example 24, the grain diameter of crystal grains of the lower recording layer 122a was smaller in the case where the lower recording layer 122a was formed of CoCrPt—$SiO_2$—$TiO_2$ (Examples 21 and 22) than in the case where the lower recording layer 122a was formed of CoCrPt—$SiO_2$ (Comparative Examples 23 and 24). Therefore, it can be seen that, when grain boundaries of the magnetic recording layer 122 (particularly the lower recording layer 122a) are formed by a plurality of oxides, characteristics of a plurality of oxides can be obtained. It can be seen that size reduction and isolation of the crystal grains (magnetic grains) of the magnetic recording layer 122 can further be promoted as compared to a case where the grain boundaries are formed by one kind of oxide. Therefore, size increase of the crystal grains of the magnetic recording layer 122 is prevented even if the crystal orientation is remarkably improved due to the interposition of the first preceding underlayer 116a. Thus, it can be seen that the SNR can drastically be improved.

As described above, according to the present embodiment, the first preceding underlayer 116a is provided between the second soft magnetic layer 114c (the soft magnetic layer 114) and the second preceding underlayer 116b (the preceding underlayer 116). Accordingly, the crystal orientation of the layer formed on the soft magnetic layer 114 can be improved. Furthermore, the grain boundaries of the lower recording layer 122a (the magnetic recording layer 122) are formed by a plurality of oxides. Accordingly, size increase of crystal grains (magnetic grains) due to improvement of the crystal orientation can be prevented so that the SNR can drastically be improved. Consequently, the recording density of the perpendicular magnetic recording medium 100 can further be increased.

In the present embodiment, the second preceding underlayer 116b is formed of an alloy layer of NiW (Ni compound). The present invention is not limited to this example. The second preceding underlayer 116b may be formed of any crystalline material. Therefore, the second preceding underlayer 116b may be formed solely of Ni.

Third Embodiment

The inventors have found that a boundary surface between a non-magnetic layer and a soft magnetic layer tends to be roughened if a bias voltage is applied to a substrate when the non-magnetic layer is formed on the soft magnetic layer (on sputtering). Therefore, the inventors considered forming a non-magnetic layer without application of a bias voltage. However, application of a bias voltage during the formation of the non-magnetic layer is performed for improvement of magnetostatic characteristics. Therefore, characteristics are considerably deteriorated if no bias voltage is applied. Accordingly, application of a bias voltage is required during the formation of the non-magnetic layer.

The inventors have continuously studied and have found that, when a layer is interposed between a non-magnetic layer and a soft magnetic layer formed below the non-magnetic layer under certain conditions, adverse influence on the soft magnetic layer from the non-magnetic layer can be eliminated while the non-magnetic layer is formed with application of a bias voltage. Thus, the inventors have found the solution for the above problems.

In the present embodiment, a first non-magnetic layer of amorphous Ni compound is formed on a soft magnetic layer without a bias voltage applied to a substrate. A second non-magnetic layer of crystalline Ni compound is formed on the first non-magnetic layer with a bias voltage applied to the substrate. An underlayer of Ru or Ru compound is formed on the second non-magnetic layer. A magnetic recording layer for recording signals is formed above the underlayer.

Portions that differ from the first embodiment or portions that should be explained in greater detail will be described below. This is to omit the redundant explanation.

The first preceding underlayer 116a is formed of amorphous Ni compound. The first preceding underlayer 116a has a function of protecting the soft magnetic layer 114 from the sputtering deposition of the second preceding underlayer 116b. Specifically, an amorphous material has hardness higher than a crystalline material. Therefore, when the first preceding underlayer 116a that is formed of an amorphous material is provided between the second preceding underlayer 116b and the soft magnetic layer 114, the soft magnetic layer 114 can suitably be protected from impact of formation of the second preceding underlayer 116b by the hard film (the first preceding underlayer 116a) even if the second preceding underlayer 116b (the second non-magnetic layer) is formed with application of a bias voltage as in the prior art. Accordingly, adverse influence on the soft magnetic layer 114 can be eliminated at the time of the formation of the second preceding underlayer 116b, and the surface roughness of the soft magnetic layer 114 can be reduced (the surface roughness of the soft magnetic layer 114 does not increase). Thus, the roughness of boundary surfaces of the multiple layers formed on the soft magnetic layer 114 can be improved (reduced) so that the crystal orientation of those layers can be improved. Therefore, improvement of the SNR and increase of the recording density can be achieved.

Furthermore, since grains of an amorphous material have no crystal structure, grains of the amorphous material are deposited randomly on the soft magnetic layer 114. Therefore, fine irregularities of a surface of the soft magnetic layer 114 that have been produced by microcrystals can be smoothened by the amorphous first non-magnetic layer 116a. Thus, the surface roughness of the soft magnetic layer 114 and the interface roughness of the layer formed on the soft magnetic layer 114 can be reduced.

In the present embodiment, the first preceding underlayer 116a is formed without application of a bias voltage to the disk substrate 110. Therefore, the soft magnetic layer 114 is not damaged at the time of formation of the first preceding underlayer 116a, and the surface roughness of the soft magnetic layer 114 can be prevented from increasing. Accordingly, the roughness of the boundary surface between the soft magnetic layer 114 and the first preceding underlayer 116a does not increase.

Furthermore, it is preferable for the first preceding underlayer 116a to further include one or more elements selected from the group consisting of Ta, Ti, Hf, Re, Os, Ir, Mo, Nb, Zr, and V or a compound thereof. In such a case, the first preceding underlayer 116a can suitably be formed into an amorphous phase. In order to ensure formation of an amorphous phase of the first preceding underlayer 116a, it is preferable to contain the aforementioned element(s) or compound thereof in a range of 40 atomic % to 60 atomic %. If the ratio of such element(s) or compound is less than 40 atomic %, it is undesirable because formation of an amorphous phase becomes insufficient. If the ratio is higher than 60 atomic %, it is undesirable because the amount of Ni, which is a base of growth of crystal grains of the second preceding underlayer 116b formed on the first preceding underlayer 116a, unfavorably becomes insufficient.

The second preceding underlayer 116b is formed of crystalline Ni compound. The second preceding underlayer 116b has a function of preventing corrosion deposition from the soft magnetic layer 114 and a function of maintaining good magnetic characteristics. Furthermore, the second preceding underlayer 116b also has a function of aligning the magnetization easy axis of the hexagonal close-packed structure (hcp structure) included in the underlayer 118 formed on the second preceding underlayer 116b with a direction perpendicular to the disk. Therefore, it is preferable for the crystalline material of the second preceding underlayer 116b to have an fcc structure. In such a case, crystal grains of the underlayer 118 having an hcp structure grow on the (111) surface of the fcc structure of the second preceding underlayer 116b, so that the magnetization easy axis of the underlayer 118 can be oriented to the perpendicular direction. Accordingly, noise can be reduced, and the SNR can further be improved. The (111) surface of the face-centered cubic structure (fcc structure) of the second preceding underlayer 116b is preferably in parallel to the principal surface of the disk substrate 110.

In the present embodiment, the second preceding underlayer 116b is formed while a bias voltage is applied to the disk substrate 110. With this configuration, atomic distance matching of the second preceding underlayer 116b and the underlayer 118 can be conducted, and the crystal orientation of the underlayer 118 can be improved. The perpendicular magnetic recording medium 100 can maintain excellent magnetic characteristics. In the present embodiment, since the first preceding underlayer 116a is provided between the soft magnetic layer 114 and the second preceding underlayer 116b as described above, the surface roughness of the soft magnetic layer 114 does not increase even if a bias voltage is applied to the substrate during the formation of the second preceding underlayer 116b.

Furthermore, it is preferable for the second preceding underlayer 116b to further include one or more elements selected from the group consisting of W, Cr, Mo, Re, Al, Cu, and Mn or a compound thereof. In such a case, the second preceding underlayer 116b can suitably be non-magnetized and crystallized. Particularly, the atomic distance of W is closer to the atomic distance of Ru as compared to the atomic distance of Ni. Therefore, when the second preceding underlayer 116b contains W, the atomic distance of the second preceding underlayer 116b can be made similar to the atomic distance of the underlayer 118 of Ru in the case where Ni is used for the second preceding underlayer 116b. Accordingly, it is possible to promote continuous growth of crystal grains from the second preceding underlayer 116b to the underlayer 118. Thus, it is preferable to form the second preceding underlayer 116b of NiW.

In order to ensure crystallization of the second preceding underlayer 116b, it is preferable to contain the aforementioned element(s) or compound thereof in a range of 3 atomic % to 8 atomic %. If the ratio of such element(s) or compound is less than 3 atomic %, it is undesirable because the second preceding underlayer 116b shows a ferromagnetic property. If the ratio is higher than 8 atomic %, it is undesirable because the crystallization of the second preceding underlayer 116b becomes insufficient so that the corrosion resistance characteristics and magnetic characteristics are unfavorably deteriorated to a large extent.

As described above, in the present embodiment, each of the first preceding underlayer 116a and the second preceding underlayer 116b is formed of NI compound. Therefore, the atomic distance of the crystals of the first preceding underlayer 116a can be made similar to the atomic distance of the crystals of the second preceding underlayer 116b. Accordingly, the crystallinity of the second preceding underlayer 116b is improved, and hence the crystallinity and the crystal orientation of the underlayer 118 are also improved. Consequently, the SNR can further be improved.

Examples

There will be described Examples of the present invention and Comparative Examples. Parts of Examples and Comparative Examples in the third embodiment that are not described below were produced with the same composition, with the same film thickness, or under the same deposition conditions as in the first embodiment. The first preceding underlayer 116a was formed of 50Ni-50Ta, and the second preceding underlayer 116b was formed of 95Ni-5W.

Figure 6A:
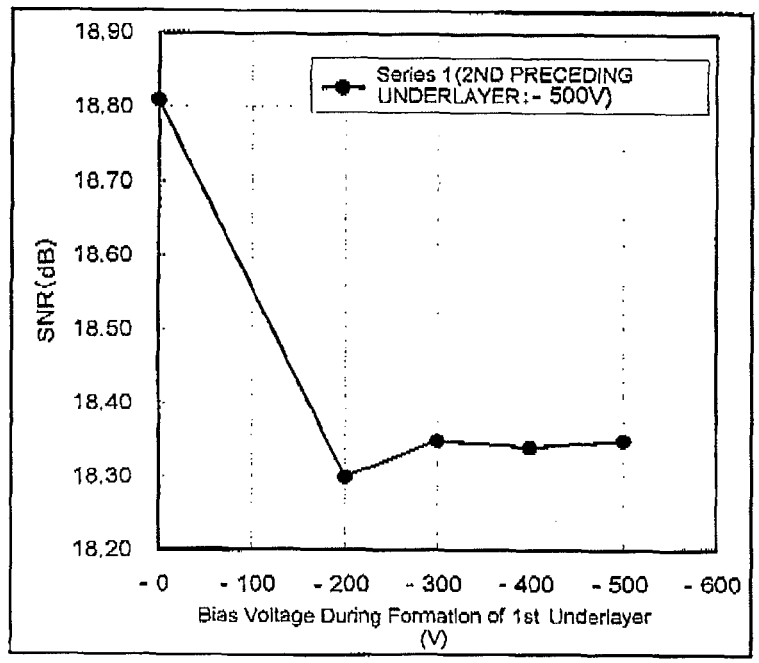
FIGS. 6A and 6B are graphs showing variation of the SNR with respect to a bias voltage.
Figure 6B:
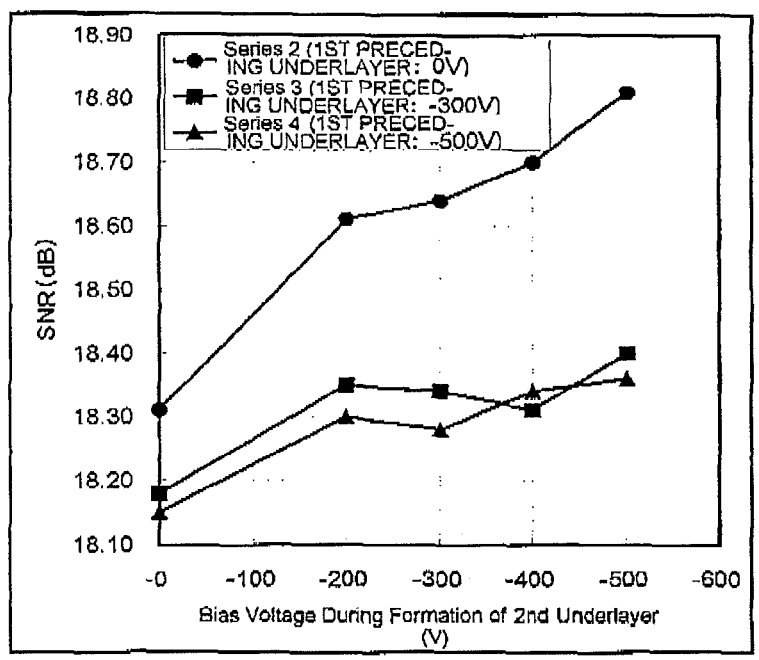

FIGS. 6A and 6B are graphs showing variation of the SNR with respect to a bias voltage. FIG. 6A shows variation of the SNR in a case where a bias voltage was set at a constant value of −500 V during the formation of the second preceding underlayer 116b and was varied during the formation of the first preceding underlayer 116a (Series 1). FIG. 6B shows variation of the SNR in cases where a bias voltage was set at certain constant values during the formation of the first preceding underlayer 116a and was varied during the formation of the second preceding underlayer 116b. In FIG. 6B, Series 2 shows variation of the SNR in a case where the bias voltage was set at a constant value of 0 V during the formation of the first preceding underlayer 116a. Series 3 shows variation of the SNR in a case where the bias voltage was set at a constant value of −300 V during the formation of the first preceding underlayer 116a. Series 4 shows variation of the SNR in a case where the bias voltage was set at a constant value of −500 V during the formation of the first preceding underlayer 116a.

As shown in FIG. 6A, the SNR was considerably lowered when the bias voltage applied to the disk substrate 110 during the formation of the first preceding underlayer 116a was increased (to be precise, the absolute value of the bias voltage was increased). Conceivably, this is because the soft magnetic layer was damaged during the formation of the first preceding underlayer 116a so as to cause deterioration of the crystal orientation when the bias voltage was applied to the disk substrate 110 during the formation. Thus, it can be seen that the first preceding underlayer 116a should be formed without application of a bias voltage to the disk substrate 110.

When the second preceding underlayer 116b was formed, with application of a bias voltage, on the first preceding underlayer 116a that had been formed without application of a bias voltage, as shown in FIG. 6B, the SNR was improved in each of Series as the applied bias voltage was increased. Conceivably, this is because, when a bias voltage was applied during the formation of the second preceding underlayer 116b, the surface roughness of the soft magnetic layer 114 was prevented from increasing as the soft magnetic layer 114 was protected by the first preceding underlayer 116a. The roughness of the boundary surface between the preceding underlayer 116 and the soft magnetic layer 114 was reduced, so that the crystal orientation was improved.

Furthermore, in each of Series in FIG. 6B, the SNR was improved most significantly from a bias voltage of 0 V (i.e., no bias voltage) to a bias voltage of −200 V during the formation of the second preceding underlayer 116b. Therefore, in order to maintain excellent magnetic characteristics (particularly the SNR) of the perpendicular magnetic recording medium 100, it is effective to apply any bias voltage to the disk substrate 110 during the formation of the second preceding underlayer 116b.

Moreover, referring to FIG. 66, the SNR of Series 2 was higher than that of Series 3 or 4, irrespective of application of a bias voltage during the formation of the second preceding underlayer 116b and the magnitude of the bias voltage. Therefore, in order to maintain a high SNR, it is highly effective to form the first preceding underlayer 116a without any bias voltage applied to the disk substrate 110. When Series 3 and Series 4 were compared, the SNR of Series 3 was slightly higher than that of Series 4. Therefore, it can be seen that a bias voltage should be set as low as possible if the bias voltage needs to be applied to the disk substrate 110 during the formation of the first preceding underlayer 116a.

As described above, according to the present embodiment, the first preceding underlayer 116a is formed on the soft magnetic layer 114 without application of a bias voltage to the disk substrate 110. With this configuration, it is possible to eliminate adverse influence on the soft magnetic layer 114 from the second preceding underlayer 116b that has been formed with application of a bias voltage to the disk substrate 110. Thus, the surface roughness of the soft magnetic layer 114 can be prevented from increasing, and the roughness of boundary surfaces of layers formed on the soft magnetic layer 114 can accordingly be prevented from increasing. Therefore, while the preceding underlayer 116 (the second preceding underlayer 116b) is formed with application of a bias voltage, the crystal orientation and the SNR can be improved. Thus, further increase of the recording density can be achieved.

Fourth Embodiment

The inventors have found that a boundary surface between a second non-magnetic layer and a soft magnetic layer tends to be roughened if a bias voltage is applied to a substrate when the second non-magnetic layer is formed on the soft magnetic layer (on sputtering). Therefore, the inventors considered forming a second non-magnetic layer without application of a bias voltage. However, application of a bias voltage during the formation of the second non-magnetic layer is performed for improvement of magnetostatic characteristics (particularly the magnetic coercive force (Ho)). Therefore, characteristics are considerably deteriorated if no bias voltage is applied. Accordingly, application of a bias voltage is required during the formation of the second non-magnetic layer.

The inventors have continuously studied and have found that, when a layer is interposed between a second non-magnetic layer and a soft magnetic layer formed below the second non-magnetic layer under certain conditions, adverse influence on the soft magnetic layer from the second non-magnetic layer can be eliminated while the second non-magnetic layer is formed with application of a bias voltage. Thus, the inventors have found the solution for the above problems.

In the present embodiment, there will be described a method of manufacturing a perpendicular magnetic recording medium in which a first non-magnetic layer that is harder than a soft magnetic layer has been formed. Portions that differ from the first embodiment or portions that should be explained in greater detail will be described below. This is to omit the redundant explanation.

In the present embodiment, the soft magnetic layer 114, particularly the second soft magnetic layer 114c, is formed by using a target of a material having a Vickers hardness of A (HV). The detail of the Vickers hardness will be described later.

The first preceding underlayer 116a is formed of Ni or Ni compound for protecting the soft magnetic layer 114. In the present embodiment, the first preceding underlayer 116a is formed by using a target of a material having a Vickers hardness of B (HV). The Vickers hardness (A) of the material of the target for forming the soft magnetic layer 114 and the Vickers hardness (B) of the material of the target for forming the first preceding underlayer 116a are set such that A<B.

With this configuration, the first preceding underlayer 116a has a Vickers hardness higher than that of the soft magnetic layer 114. Therefore, the first preceding underlayer 116a can have a function of protecting the soft magnetic layer 114 from the sputtering deposition of the second preceding underlayer 116b. Specifically, when the first preceding underlayer 116a that is harder than the soft magnetic layer 114 is provided between the second preceding underlayer 116b and the soft magnetic layer 114, the soft magnetic layer 114 is protected by the first preceding underlayer 116a even if the second preceding underlayer 116b is formed with application of a bias voltage as in the prior art. Therefore, it is possible to eliminate adverse influence on the soft magnetic layer 114 from the second preceding underlayer 116b. Thus, the surface roughness of the soft magnetic layer 114 is reduced. In other words, the surface roughness of the soft magnetic layer 114 does not increase. Accordingly, the roughness of boundary surfaces of the multiple layers formed on the soft magnetic layer 114 is improved (or reduced) so that the crystal orientation of those layers can be improved. Therefore, improvement of the SNR and further increase of the recording density can be achieved.

The Vickers hardness (B) of the first preceding underlayer 116a is preferably at least 800 HV. This is because the Vickers hardness of a soft magnetic layer 114 currently used is equal to or higher than about 700 HV and is lower than 750 HV. If the Vickers hardness of the first preceding underlayer 116a exceeds that value, the first preceding underlayer 116a can suitably protect the soft magnetic layer 114.

Furthermore, it is preferable for the first preceding underlayer 116a to further include Ta or Ti. Specifically, the first preceding underlayer 118a is preferably formed of NiTa or NiTi. In such a case, the Vickers hardness of the first preceding underlayer 116a can suitably be increased.

In order to ensure that the Vickers hardness of the first preceding underlayer 116a is higher than that of the soft magnetic layer 114, it is preferable for the first preceding underlayer 116a to contain Ta in a range of 40 atomic % to 85 atomic %. With this configuration, the soft magnetic layer 114 can suitably be protected by using the first preceding underlayer 116a.

Furthermore, the film thickness of the first preceding underlayer 116a is preferably in a range of 1 nm to 3 nm. If the thickness of the first preceding underlayer 116a is less than 1 nm, then the first preceding underlayer 116a may be unable to satisfactorily protect the soft magnetic layer 114. If the thickness of the first preceding underlayer 116a is greater than 3 nm, then the first preceding underlayer 116a may inhibit transmission of the magnetic flux to the soft magnetic layer 114 when signals are written in the perpendicular magnetic recording medium 100.

The second preceding underlayer 116b is a non-magnetic alloy layer formed of Ni or Ni compound. With this configuration, it is possible to prevent corrosion deposition from the soft magnetic layer 114 and to maintain the magnetic characteristics. The second preceding underlayer 116b has a function of aligning the magnetization easy axis of the hexagonal close-packed structure (hcp structure) included in the underlayer 118 formed on the second preceding underlayer 116b with a direction perpendicular to the disk. It is preferable for the second preceding underlayer 116b to have a structure in which the (111) surface of the face-centered cubic structure (fcc structure) is in parallel to the principal surface of the disk substrate 110. Moreover, such a crystal structure and an amorphous structure may be mixed in the second preceding underlayer 116b.

Furthermore, it is preferable for the second preceding underlayer 116b to further include W. Specifically, the second preceding underlayer 116b is preferably formed of NiW. Here, the atomic distance of W is closer to the atomic distance of Ru as compared to the atomic distance of Ni. Therefore, when the second preceding underlayer 116b contains W, the atomic distance of the Ni compound of the second preceding underlayer 116b can be made similar to the atomic distance of the underlayer 118 of Ru. Accordingly, it is possible to promote continuous growth of crystal grains from the second preceding underlayer 116b to the underlayer 118.

Furthermore, for atomic distance matching with the underlayer 118, the second preceding underlayer 116b may be formed by sputtering while a bias is applied to the disk substrate 110. In this case, the crystal orientation of the underlayer 118 can be improved. At that time, provision of the first preceding underlayer 116a below the second preceding underlayer 116b prevents the surface layer of the soft magnetic layer 114 from being roughened even if a bias is applied during the formation of the second preceding underlayer 116b.

As described above, in the present embodiment, both of the first preceding underlayer 116a and the second preceding underlayer 116b contain Ni. Therefore, the atomic distance of the first preceding underlayer 116a can be made similar to the atomic distance of the second preceding underlayer 116b. Accordingly, crystal grains grow continuously from the first preceding underlayer 116a to the second preceding underlayer 116b, resulting in further improvement of the crystal orientation.

In the present embodiment, the first preceding underlayer 116a is preferably formed of NiTa or NiTi, and the second preceding underlayer 116b is preferably formed of NiW. However, the present invention is not limited to those examples. The first preceding underlayer 116a may be formed of any material that can provide a Vickers hardness that exceeds the Vickers hardness of the soft magnetic layer 114. The second preceding underlayer 116b may be formed of any material that can prevent corrosion deposition from the soft magnetic layer 114 and can maintain the magnetic characteristics. Therefore, the first preceding underlayer 116a and the second preceding underlayer 116b may be formed of a material selected from among Ni, Cu, Pt, Pd, Zr, Hf, Nb, and Ta. Furthermore, the first preceding underlayer 116a and the second preceding underlayer 116b may be formed of alloy that contains the aforementioned metal as a principal component and also contains one or more additive elements of Ti, V, Cr, Mo, and W.

Figure 7:
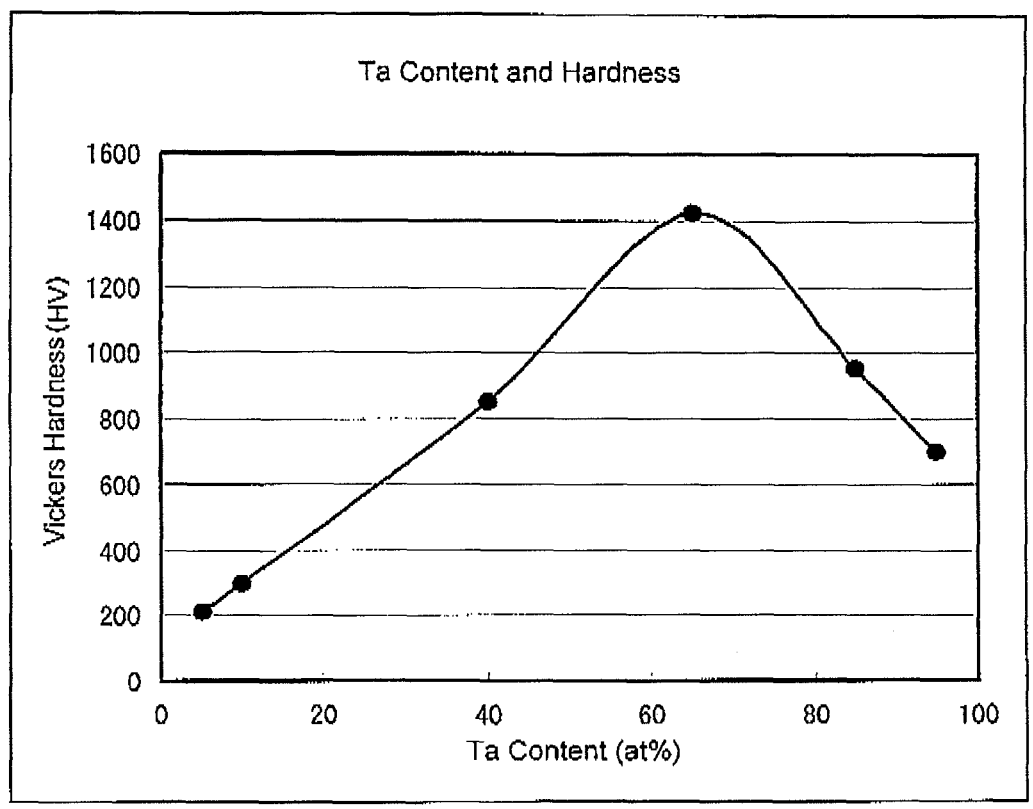
FIG. 7 is a graph showing variation of the Vickers hardness of the first preceding underlayer with respect to the compositional ratio of the first preceding underlayer.

FIG. 7 is a graph showing variation of the Vickers hardness of the first preceding underlayer 116a with respect to the compositional ratio. The first preceding underlayer 116a was formed of NiTa. A specimen was produced by a quenched ribbon method (melt-spun method). The Vickers hardness was measured by pressing an indentator into the specimen under a test load of 25 g. The Vickers hardness shown in FIG. 7 was defined by an average of 10 measurements.

As shown in FIG. 7, the Vickers hardness of the first preceding underlayer 116a was higher as the Ta content increased. The Vickers hardness peaked when the Ta content was about 70 atomic %. When the Ta content was further increased, the Vickers hardness decreased. Thus, referring to FIG. 7, in order to ensure that the Vickers hardness of the first preceding underlayer 116a formed of Ni and Ta is higher than that of the soft magnetic layer 114, i.e., the Vickers hardness is at least 800 HV, the Ta content should be in a range of 40 atomic % to 85 atomic %.

Figures 8A, 8B:
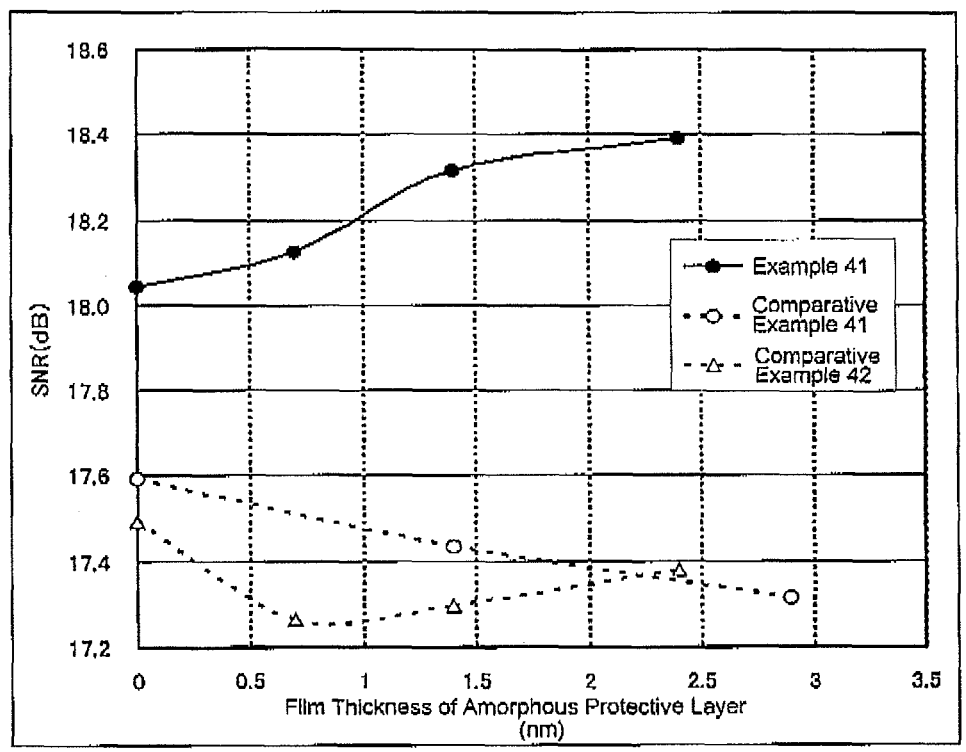
FIGS. 8A and 8B show variation of the SNR with respect to the film thickness of the first preceding underlayer.

FIGS. 8A and 8B show variation of the SNR with respect to the film thickness of the first preceding underlayer 116a. FIG. 8A is a table showing the compositions and the SNR values of Example and Comparative Examples. FIG. 8B is a graph showing variation of the SNR in Example and Comparative Examples. In each of Example and Comparative Examples, the second preceding underlayer 116b contained 95 atomic % Ni and 5 atomic % W.

As shown in FIG. 8A, Example 41 employed a perpendicular magnetic recording medium 100 including a first preceding underlayer 116a formed of 45Ni-55Ta with a Vickers hardness of 950 HV and a second preceding underlayer 116b having a film thickness of 7.2 nm. Comparative Example 41 employed a perpendicular magnetic recording medium 100 including a first preceding underlayer 116a formed of 97Ni-3W with a Vickers hardness of 160 HV and a second preceding underlayer 116b having a film thickness of 4.3 nm. Comparative Example 42 employed a perpendicular magnetic recording medium 100 including a first preceding underlayer 116a formed of 90Ni-10Ta with a Vickers hardness of 250 HV and a second preceding underlayer 116b having a film thickness of 5.8 nm.

When the film thickness of the first preceding underlayer 116a of Example and Comparative Examples was varied as shown in FIG. 8A, then the SNR varied as shown in FIG. 8B. Referring to FIG. 8B, it can be seen that a higher SNR could be obtained in Example 41 as compared to Comparative Examples 41 and 42. Thus, according to this embodiment, the Vickers hardness (A) of a material of a target for forming the soft magnetic layer 114 and the Vickers hardness (B) of a material of a target for forming the first preceding underlayer 116a are set such that A<B. The first preceding underlayer 116a formed by using such a target is interposed between the soft magnetic layer 114 and the second preceding underlayer 116b. In such a case, the soft magnetic layer 114 can be protected from the sputtering deposition of the second preceding underlayer 116b, and adverse influence on the soft magnetic layer 114 from the second preceding underlayer 116b can be eliminated. Therefore, the surface roughness of the soft magnetic layer 114 is reduced, and the roughness of boundary surfaces of the multiple layers formed on the soft magnetic layer 114 can be improved (or reduced). Consequently, the crystal orientation of those layers is improved, so that the SNR is improved.

As described above, according to the present embodiment, the first preceding underlayer 116a formed by using a target having a Vickers hardness higher than the Vickers hardness of a target used for forming the soft magnetic layer 114 is provided on the soft magnetic layer 114. In this case, the surface roughness of the soft magnetic layer 114 is prevented from increasing during the formation of the second preceding underlayer 116b. The roughness of the boundary surface between the second preceding underlayer 116b and the soft magnetic layer 114 is reduced. Therefore, the crystal orientation of the layers formed on the soft magnetic layer 114 is improved. Consequently, improvement of the SNR and further increase of the recording density can be achieved.

Although preferred examples of the present invention have been described above with reference to the accompanying drawings, the present invention is not limited to those examples. It would be apparent to those skilled in the art that many modifications and variations may be made therein within the scope of the present invention recited in the claims. It should be understood that those modifications and variations fall within the scope of the present invention.

INDUSTRIAL APPLICABILITY

The present invention is applicable to a perpendicular magnetic recording medium mounted on a perpendicular magnetic recording type hard disk drive (HDD) or the like and to a method of manufacturing such a medium.

What is claimed is:

1. A perpendicular magnetic recording medium comprising a magnetic recording layer that records a signal, an underlayer formed of Ru or Ru compound below the magnetic recording layer, a non-magnetic layer formed of a non-magnetic material below the underlayer to control crystal orientation of the underlayer, a soft magnetic layer provided below the non-magnetic layer, and a substrate on which the magnetic recording layer, the underlayer, the non-magnetic layer, and the soft magnetic layer are formed, the non-magnetic layer comprising a first non-magnetic layer formed above the soft magnetic layer and a second non-magnetic layer formed above the first non-magnetic layer, the first non-magnetic layer being formed of amorphous Ni compound, and the second non-magnetic layer being formed of crystalline Ni or crystalline Ni compound, wherein the first non-magnetic layer contains one or more elements selected from the group consisting of Ta, Ti, Hf, Re, Os, Ir, Mo, Nb, Zr, and V or a compound thereof in a range of from 40 atomic % to 60 atomic %, wherein the second non-magnetic layer contains one or more elements selected from the group consisting of W, Cr, Mo, Re, Al, Cu, and Mn or a compound thereof in a range of from 3 atomic % to less than 6 and more than 2 atomic %, and wherein the surface roughness at the interface between the soft magnetic layer and first non-magnetic layer is 0.18 nm or less.

2. The perpendicular magnetic recording medium as recited in claim 1 wherein the magnetic recording layer is formed of a Co-based alloy that grows into a columnar shape to form magnetic crystal grains and a plurality of oxides that forms non-magnetic grain boundaries between the crystal grains.

3. The perpendicular magnetic recording medium as recited in claim 2, wherein the first non-magnetic layer contains: one or more elements selected from the group consisting of Fe, Co, Cu, Zn, Pd, and Pt or a compound thereof.

4. The perpendicular magnetic recording medium as recited in claim 2, wherein the second non-magnetic layer contains: one or more elements selected from the group consisting of Co, Cu, Cr, Y, and Ag or a compound thereof.

5. The perpendicular magnetic recording medium as recited in claim 2, wherein the oxides comprise an oxide of an element selected from the group consisting of Si, Ti, Cr, Co, Ta, Ru, and Cu.

* * * * *